United States Patent
Yin et al.

(10) Patent No.: US 9,602,251 B2
(45) Date of Patent: Mar. 21, 2017

(54) DEVICES FOR RECONFIGURING UPLINK AND DOWNLINK ALLOCATIONS IN TIME DOMAIN DUPLEXING WIRELESS SYSTEMS

(75) Inventors: Zhanping Yin, Vancouver, WA (US); Shohei Yamada, Camas, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 625 days.

(21) Appl. No.: 13/360,572

(22) Filed: Jan. 27, 2012

(65) Prior Publication Data

US 2013/0194980 A1  Aug. 1, 2013

(51) Int. Cl.
| | | |
|---|---|---|
| *H04L 1/18* | (2006.01) | |
| *H04L 1/16* | (2006.01) | |
| *H04W 72/04* | (2009.01) | |
| *H04W 72/12* | (2009.01) | |

(52) U.S. Cl.
CPC .......... *H04L 1/1854* (2013.01); *H04L 1/1607* (2013.01); *H04W 72/04* (2013.01); *H04W 72/12* (2013.01)

(58) Field of Classification Search
CPC ... H04L 5/0044; H04L 5/0053; H04L 5/0055; H04L 5/0035; H04L 5/0048; H04L 5/0096; H04L 1/1607; H04L 1/1812; H04L 1/1854; H04W 72/042; H04W 72/0446;
(Continued)

(56) References Cited

U.S. PATENT DOCUMENTS

| | | | |
|---|---|---|---|
| 2009/0135748 A1 | 5/2009 | Lindoff et al. | |
| 2009/0201838 A1* | 8/2009 | Zhang et al. | 370/280 |
| 2009/0213769 A1* | 8/2009 | Shen et al. | 370/280 |

(Continued)

FOREIGN PATENT DOCUMENTS

| | | |
|---|---|---|
| WO | 2009/035399 | 3/2009 |
| WO | 2011/044494 | 4/2011 |
| WO | 2012/046505 | 4/2012 |

OTHER PUBLICATIONS

CATT, "TDD Inter-Band Carrier Aggregation," 3GPP TSG RAN WG1 Meeting #66, R1-112106, Aug. 2011.
(Continued)

*Primary Examiner* — Yemane Mesfin
*Assistant Examiner* — Peter Chen
(74) *Attorney, Agent, or Firm* — Austin Rapp & Hardman

(57) ABSTRACT

A User Equipment (UE) for reconfiguring uplink and downlink (UL-DL) allocations is described. The UE includes a processor and instructions stored in memory that is in electronic communication with the processor. The UE determines whether at least one subframe is convertible over a default Time Domain Duplexing (TDD) UL-DL configuration. If at least one subframe is convertible, then the UE determines a first reference UL-DL configuration and a second reference UL-DL configuration. The UE also sends any hybrid automatic repeat request acknowledgement (HARQ-ACK) information corresponding to a Physical Downlink Shared Channel (PDSCH) based on the first reference configuration. The UE further determines a Physical Uplink Shared Channel (PUSCH) schedule based on the second reference UL-DL configuration. The UE additionally receives any hybrid automatic repeat request acknowledgement (HARQ-ACK) information corresponding to a Physical Uplink Shared Channel (PUSCH) based on the second reference UL-DL configuration.

4 Claims, 12 Drawing Sheets

(58) Field of Classification Search
CPC ............. H04W 72/04; H04W 72/0453; H04W 72/0413; H04W 72/02
See application file for complete search history.

(56) References Cited

U.S. PATENT DOCUMENTS

| | | | | |
|---|---|---|---|---|
| 2009/0249153 | A1* | 10/2009 | Zhang | 714/748 |
| 2009/0274071 | A1 | 11/2009 | Ramesh et al. | |
| 2010/0189081 | A1 | 7/2010 | Zhang et al. | |
| 2010/0238847 | A1 | 9/2010 | Suo et al. | |
| 2010/0246456 | A1 | 9/2010 | Suo et al. | |
| 2010/0278083 | A1 | 11/2010 | Kwak et al. | |
| 2011/0032855 | A1 | 2/2011 | Kim et al. | |
| 2011/0211503 | A1* | 9/2011 | Che et al. | 370/280 |
| 2011/0317616 | A1* | 12/2011 | Seo et al. | 370/315 |
| 2012/0113875 | A1* | 5/2012 | Alanara et al. | 370/280 |
| 2012/0127938 | A1* | 5/2012 | Lv | H04W 72/1205 370/329 |
| 2013/0188516 | A1* | 7/2013 | He et al. | 370/254 |
| 2013/0188533 | A1* | 7/2013 | He et al. | 370/280 |
| 2013/0294423 | A1* | 11/2013 | Wang et al. | 370/336 |
| 2014/0029552 | A1* | 1/2014 | Lv | H04L 1/1887 370/329 |
| 2014/0160967 | A1* | 6/2014 | Gao | H04W 24/10 370/252 |

OTHER PUBLICATIONS

CATT, "Design of TDD Inter-Band Carrier Aggregation," 3GPP TSG RAN WG1 Meeting #66bis, R1-112944, Oct. 2011.
CATT, "Design of TDD Inter-Band Carrier Aggregation," 3GPP TSG RAN WG1 Meeting #67, R1-113724, Nov. 2011.
International Search Report issued for International Application No. PCT/JP2013/000403 on Apr. 23, 2013.
Sharp, "Fast Uplink-Downlink Re-configuration with Traffic Adaptation by PHY Layer Signaling," 3GPP TSG-RAN WG1 #66, R1-112300, Aug. 2011.
International Search Report issued for International Application No. PCT/JP2012/005126 on Oct. 30, 2012.
U.S. Appl. No. 13/208,529, filed Aug. 12, 2011, Zhanping Yin et al.
U.S. Appl. No. 13/248,777, filed Sep. 29, 2011, Zhanping Yin et al.
CATT, Ericsson, ST-Ericsson, "New Study Item Proposal for Further Enhancements to LTE TDD for DL-UL Interference Management and Traffic Adaptation," 3GPP TSG-RAN Meeting #51, RP-110450, Mar. 2010.
Email Discussion Rapporteur (CATT), "Summary of Email Discussion on Simulation Assumptions for Study on Further Enhancements to LTE TDD for DL-UL Interference Management and Traffic Adaptation," 3GPP TSG RAP WG1 Meeting #66, R1-112884, Aug. 2011.
RAN Chairman, RAN4 Chairman, "Work Plan for Rel-11 SI FS_LTE_TDD_eIMTA,"3GPP TSG RAN Meeting #54, RP-111755, Dec. 2011.
CMCC, "Application Scenario of Dynamic UL/DL Asymmetry for TDD," 3GPP TSG-RAN WG1 #65, R1-111778, May 2011.
CMCC, "Further Discussion on UL/DL Asymmetry for TDD System," 3GPP TSG-RAN WG1 #66, R1-112590, Aug. 2011.
Sharp, "Fast Uplink-Downlink Re-Configuration with Traffic Adaptation by Phy Layer Signaling," 3GPP TSG-RAN WG1 #66, R1-112487, Aug. 2011.
Samsung, "Preliminary Evaluation of TDD UL-DL Reconfiguration Performance," 3GPP TSG RAN WG1 #66, R1-112525, Aug. 2011.
3GPP TS 36.211 V10.2.0, "Evolved Universal Terrestrial Radio Access (E-UTRA); Physical Channels and Modulation (Release 10)," Jun. 2011.
3GPP TS 36.213 V10.2.0, "Evolved Universal Terrestrial Radio Access (E-UTRA); Physical Layer Procedures (Release 10)," Jun. 2011.
3GPP TS 36.331 V10.2.0, "Evolved Universal Terrestrial Radio Access (E-UTRA); Radio Resource Control (RRC); Protocol Specification (Release 10)," Jun. 2011.
3GPP TS 36.212 V10.2.0, "Evolved Universal Terrestrial Radio Access (E-UTRA); Multiplexing and Channel Coding (Release 10)," Jun. 2011.
Zte, "Support to Live-Change of Downlink-Uplink Allocation Ratio in LTE/TDD," 3GPP TSG RAN WG1 Meeting #52bis, R1-081415, Apr. 2008.
Intel Corporation, "Discussion on HARQ feedback of TDD Interband Carrier Aggregation", R1-113951, 3rd Generation Partnership Project (3GPP), vol. RAN WG1, R1-113951, Nov. 9, 2011.

\* cited by examiner

DEVICES FOR RECONFIGURING UPLINK AND DOWNLINK ALLOCATIONS IN TIME DOMAIN DUPLEXING WIRELESS SYSTEMS

TECHNICAL FIELD

The present disclosure relates generally to communication systems. More specifically, the present disclosure relates to devices for reconfiguring uplink and downlink allocations.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a fixed station that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

BRIEF DESCRIPTION OF THE DRAWINGS

FIG. 10 is a diagram illustrating some UL-DL configurations that the systems and methods disclosed herein may be applied to;

DETAILED DESCRIPTION

Figure 1:
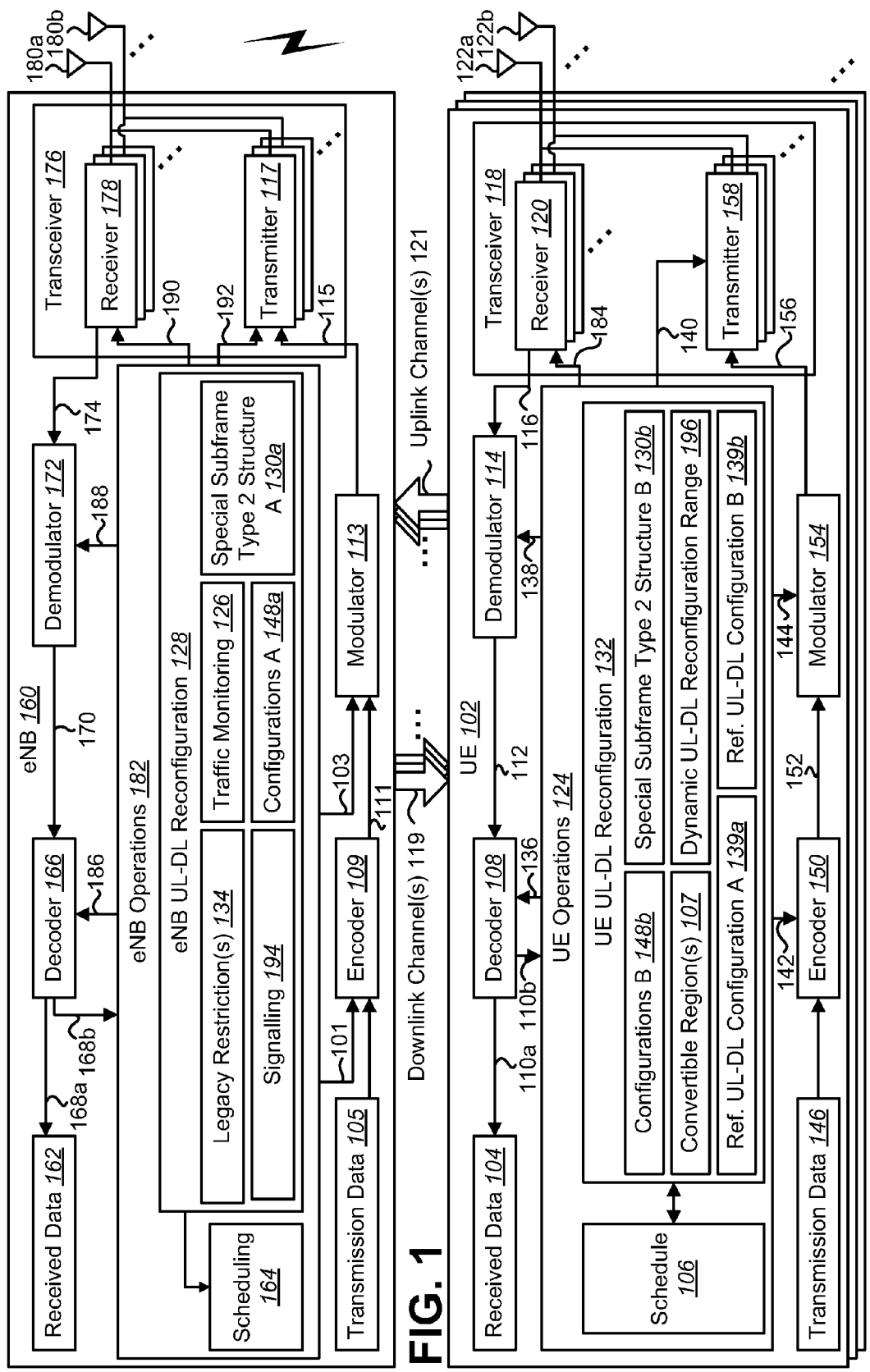
FIG. 1 is a block diagram illustrating one configuration of an evolved Node B (eNB) and one or more User Equipments (UEs) in which systems and methods for reconfiguring uplink and downlink allocations may be implemented.

A User Equipment (UE) for reconfiguring uplink and downlink (UL-DL) allocations is described. The UE includes a processor and instructions stored in memory that is in electronic communication with the processor. The UE determines whether at least one subframe is convertible over a default Time Domain Duplexing (TDD) UL-DL configuration. If at least one subframe is convertible, then the UE determines a first reference UL-DL configuration and a second reference UL-DL configuration. The UE also sends any hybrid automatic repeat request acknowledgement (HARQ-ACK) information corresponding to a Physical Downlink Shared Channel (PDSCH) based on the first reference configuration. The UE additionally determines a Physical Uplink Shared Channel (PUSCH) schedule based on the second reference UL-DL configuration. The UE further receives any hybrid automatic repeat request acknowledgement (HARQ-ACK) information corresponding to a Physical Uplink Shared Channel (PUSCH) based on the second reference UL-DL configuration.

The UE may also determine a dynamic UL-DL reconfiguration range. The UE may additionally determine one or more convertible subframes. The UE may further determine a direction of a convertible subframe.

The UE may also determine whether a subframe is a downlink subframe in a default UL-DL configuration. If the subframe is a downlink subframe in the default UL-DL configuration, then the UE may also determine whether the subframe has a scheduled PUSCH and designate the subframe as an uplink subframe or special subframe type 2 if the subframe has a scheduled PUSCH.

If the subframe does not have a scheduled PUSCH, then the UE may determine whether any convertible subframe after the subframe in a convertible region has a scheduled PUSCH. The UE may also designate the subframe as an uplink subframe if any convertible subframe after the subframe has a scheduled PUSCH and designate the subframe as a downlink subframe if any convertible subframe after the subframe does not have a scheduled PUSCH.

If the subframe is not a downlink subframe in the default UL-DL configuration, then the UE may also determine whether any convertible subframe before the subframe in a convertible region has a scheduled PDSCH. If the subframe is not a downlink subframe in the default UL-DL configuration, then the UE may additionally designate the subframe as a downlink subframe if any convertible subframe before the subframe in the convertible region has a scheduled PDSCH.

If any convertible subframe before the subframe in the convertible region does not have a scheduled PDSCH, then the UE may also determine whether the subframe has a scheduled PUSCH. If any convertible subframe before the subframe in the convertible region does not have a scheduled PDSCH, then the UE may additionally designate the subframe as an uplink subframe or a special subframe type 2 if the subframe has a scheduled PUSCH and designate the subframe as a downlink subframe if the subframe does not have a scheduled PUSCH.

An evolved Node B (eNB) for reconfiguring uplink and downlink (UL-DL) allocations is also described. The eNB includes a processor and instructions stored in memory that is in electronic communication with the processor. The eNB may determine whether at least one subframe is convertible over a default Time Domain Duplexing (TDD) UL-DL configuration. If at least one subframe is convertible, then the eNB sends a signal that indicates a first reference UL-DL configuration and a second reference UL-DL configuration or a dynamic UL-DL reconfiguration range. The eNB also receives any hybrid automatic repeat request acknowledgement (HARQ-ACK) information corresponding to a Physical Downlink Shared Channel (PDSCH) based on the first reference UL-DL configuration. The eNB additionally sends any HARQ-ACK information corresponding to a Physical Uplink Shared Channel (PUSCH) based on the second reference UL-DL configuration. The eNB may also perform PUSCH scheduling based on the second reference UL-DL configuration.

The eNB may additionally convert a subframe. The eNB may also restrict scheduling for a legacy user equipment (UE) if an uplink subframe is converted to a downlink subframe and restrict scheduling for the legacy UE if a downlink subframe is converted to an uplink subframe. Restricting scheduling if an uplink subframe is converted to a downlink subframe may include at least one of restricting scheduling PUSCH information in the uplink subframe that is converted to the downlink subframe and restricting scheduling PDSCH information in a subframe that has an association with the uplink subframe that is converted to the downlink subframe. Restricting scheduling if a downlink subframe is converted to an uplink subframe may include restricting scheduling PDSCH information in the downlink subframe that is converted to the uplink subframe.

A method for reconfiguring uplink and downlink (UL-DL) allocations on a User Equipment (UE) is also described. The method includes determining whether at least one subframe is convertible over a default Time Domain Duplexing (TDD) UL-DL configuration. If at least one subframe is convertible, then the method includes determining a first reference UL-DL configuration and a second reference UL-DL configuration. The method also includes sending any hybrid automatic repeat request acknowledgement (HARQ-ACK) information corresponding to a Physical Downlink Shared Channel (PDSCH) based on the first reference configuration. The method further includes determining a Physical Uplink Shared Channel (PUSCH) schedule based on the second reference UL-DL configuration. The method additionally includes receiving any hybrid automatic repeat request acknowledgment (HARQ-ACK) information corresponding to a Physical Uplink Shared Channel (PUSCH) based on the second reference UL-DL configuration.

A method for reconfiguring uplink and downlink (UL-DL) allocations on an evolved Node B (eNB) is also described. The method includes determining whether at least one subframe is convertible over a default Time Domain Duplexing (TDD) UL-DL configuration. If at least one subframe is convertible, then the method includes sending a signal that indicates a first reference UL-DL configuration and a second reference UL-DL configuration or a dynamic UL-DL reconfiguration range. The method also includes receiving any hybrid automatic repeat request acknowledgement (HARQ-ACK) information corresponding to a Physical Downlink Shared Channel (PDSCH) based on the first reference UL-DL configuration. The method further includes sending any HARQ-ACK information corresponding to a Physical Uplink Shared Channel (PUSCH) based on the second reference UL-DL configuration.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP Long Term Evolution (LTE), LTE-Advanced (LTE-A) and other standards (e.g., 3GPP Releases 8, 9, 10 and/or 11). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a User Equipment (UE), an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a User Equipment (UE). However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an evolved or enhanced Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device (e.g., UE) and/or a base station (e.g. eNB).

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands to be used for communication between a Node B (e.g., eNodeB, eNB) and a UE. "Configured cells" are those cells of which the UE is aware and is allowed by a Node B (e.g., eNB) to transmit or receive information. "Configured cell(s)" may be serving cell(s). The UE may receive system information and perform required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDCCH). "Deactivated cells" are those configured cells for which the UE is not monitoring the transmitted PDCCH. It should be noted that a "cell" may be described in terms of differing dimensions. For example, a "cell" may have temporal, spatial (e.g., geographical) and frequency characteristics.

The systems and methods disclosed herein may be used for reconfiguring uplink-downlink allocations. In LTE time-division duplexing (TDD), the same frequency band may be used for both uplink (UL) and downlink (DL) signals. To achieve different DL and UL allocations (e.g., traffic ratios) in LTE TDD, seven uplink-downlink (UL-DL) configurations are given in 3GPP specifications (e.g., 3GPP TS 36.211). These allocations can allocate between 40% and 90% of subframes to DL signals.

According to current specifications (e.g., LTE Releases 8, 9 and 10), a system information change procedure is used to change the UL-DL configuration. This procedure has long delay, and requires a cold system restart (e.g., all UEs in a system cannot transmit and receive for a certain period of time in order to disconnect the UL-DL associations of the old configuration and set up new associations). It should be noted that a subframe association may be referred to as an "UL-DL association," which may include UL-to-DL subframe associations and/or DL-to-UL subframe associations. Examples of associations include association of a DL subframe physical DL control channel (PDCCH) to UL power control in an UL subframe, association of a DL subframe physical DL control channel (PDCCH) to physical UL shared channel (PUSCH) allocation in an UL subframe, associations of acknowledgement and negative acknowledgement (ACK/NACK) feedback on UL subframe(s) for physical downlink shared channel (PDSCH) transmissions in DL subframe(s), association of acknowledgement and negative acknowledgement (ACK/NACK) feedback on a physical hybrid automatic repeat request (HARQ) indicator channel (PHICH) or physical downlink control channel (PDCCH) for physical UL shared channel (PUSCH) transmission(s) in UL subframe(s), etc.

Existing physical (PHY) layer signalling may be extended to enable dynamic DL-to-UL conversion. For example, a special subframe type 2 may be used, which may be viewed as an extension of a current standard special subframe that is used for DL-to-UL transition. This special subframe type 2 can be used to provide UL transmissions while maintaining existing UL-DL associations.

As used herein, a "Release 11 UE" may be a UE that may operate in accordance with anticipated 3GPP Release 11 specifications and possibly subsequent specifications. Additionally, as used herein, a "legacy UE" may be a UE that may operate in accordance with earlier (e.g., 3GPP Release 8, 9, 10) specifications.

The systems and methods disclosed herein provide a mechanism that can be applied for both DL-to-UL and UL-to-DL reconfiguration or switching. The mechanism allows applying one configuration for PDSCH hybrid automatic repeat request acknowledgement (HARQ-ACK) timing and applying another configuration for PUSCH scheduling and PUSCH HARQ-ACK timing. Release 11 UEs may follow these timings based on the corresponding reference UL-DL configurations in an allowed dynamic UL-DL reconfiguration range (e.g., switching region). Legacy UEs may follow the existing associations without any change or knowledge of the dynamic UL-DL reconfiguration. However, the eNB may restrict the legacy UEs in some subframes to maintain backward compatible timing.

In current LTE TDD systems, the UL and DL allocation is chosen from seven defined UL-DL configurations, and is synchronized system-wide. Currently, UL-DL allocation reconfiguration in a cell may be very costly because all transmissions have to be stopped to adjust the UL-DL associations. A change in one cell may cause or accompany a sequence of changes at neighbor cells (and their neighbor cells, etc.) to match UL-DL configuration synchronization at neighbor cells (and their neighbor cells, etc.). Furthermore, current UL-DL allocation reconfiguration requires a system information change. Thus, it has long delay and is not adaptive to instantaneous or short term changes in traffic load.

The systems and methods disclosed herein provide approaches for applying PDSCH HARQ-ACK and PUSCH scheduling and HARQ-ACK timings for UEs that may operate in accordance with anticipated Release 11 specifications (and beyond) based on different reference UL-DL configurations. For legacy UEs, impacts and restrictions of allowing legacy UEs to operate without any modifications to existing timings are also analyzed herein.

Based on an allowed dynamic UL-DL reconfiguration range, for example, the PDSCH HARQ-ACK, PUSCH scheduling and PUSCH HARQ-ACK timing may be configured differently for Release 11 UEs than for legacy UEs. A legacy UE should assume no HARQ-ACK and scheduling timing change. However, the eNB may schedule legacy UEs to avoid potential conflicts.

For Release 11 UEs, the PDSCH HARQ-ACK timing may be based on one reference UL-DL configuration, while PUSCH scheduling and PUSCH HARQ-ACK timing may be based on another reference UL-DL configuration. For example, the PDSCH HARQ-ACK configuration may follow a first reference UL-DL configuration with a number (e.g., minimum number) of UL subframes in the allowed dynamic UL-DL reconfiguration range. The first reference UL-DL configuration may or may not be the same as a default UL-DL configuration.

The PUSCH scheduling and PUSCH HARQ-ACK timing may follow a second reference UL-DL configuration with a number (e.g., maximum number) of UL subframes in the allowed dynamic UL-DL reconfiguration range. The second reference UL-DL configuration may or may not be the same as a default UL-DL configuration. For subframes with allowed UL-DL switching (e.g., subframes in one or more convertible regions), systems and methods are provided herein for signalling and UE behaviors when dynamic UL-DL reconfiguration is utilized.

Some unique aspects of systems and methods disclosed herein are given as follows. The systems and methods disclosed herein may provide a reference UL-DL configuration for PDSCH HARQ-ACK and a reference UL-DL configuration for PUSCH scheduling and HARQ-ACK timing for Release 11 UEs. They may provide an allowed dynamic UL-DL reconfiguration range. They may provide a convertible subframe. In accordance with the systems and methods disclosed herein, existing associations from Releases 8, 9 and 10 may be reused.

The systems and methods disclosed herein may apply a reference UL-DL configuration for PDSCH HARQ-ACK and a reference UL-DL configuration for PUSCH scheduling and HARQ-ACK timing. They may define backward compatible subframes that can be scheduled for legacy UEs, which follow default timing without knowledge of applied UL-DL reconfiguration. The systems and methods disclosed herein may utilize physical layer signalling to dynamically change the direction in convertible subframes. They may also provide an approach to decide the direction of each convertible subframe.

To support dynamic UL and DL reconfiguration while reducing UL-DL allocation reconfiguration (using a system information change, for example), the systems and methods disclosed herein describe using physical layer (e.g., PHY layer) signalling to change the UL and DL allocation with traffic adaptation. The PHY layer signalling may be an extension of existing PHY layer signalling so that standard UL-DL associations are maintained.

The systems and methods disclosed herein describe a special subframe. This special subframe may be referred to herein as a "special subframe type 2." The special subframe type 2 may support physical UL shared channel (PUSCH) transmissions in a currently configured DL subframe. A special subframe type 2 may allocate most channel resources for PUSCH transmission while maintaining the physical downlink control channel (PDCCH) as needed. Structure and configuration procedures for the special subframe type 2 are provided herein. In some implementations, all existing UL-DL associations are maintained and are transparent to legacy UEs (e.g., UEs that function according to earlier specifications). Thus, no UL-DL allocation reconfiguration (with a system information change) procedure may be needed in some cases.

For clarity, one example of a frame structure (LTE-TDD frame structure) and examples of UL-DL configurations that may be used in accordance with the systems and methods disclosed herein are given from 3GPP TS 36.211 as follows. This frame structure may be applicable in time-division duplexing (TDD) approaches. Each frame may have a length of $T_f = 307200 \cdot T_s = 10$ milliseconds (ms), where $T_f$ is a radio frame duration and $T_s$ is a time unit equal to $$\frac{1}{(15000 \times 2048)}$$

seconds. The frame may include two half-frames, each having a length of $15360 \cdot T_s = 5$ ms. Each half-frame may include five subframes, each having a length of $30720 \cdot T_s = 1$ ms. Some UL-DL frame configurations are illustrated in Table (1) (from Table 4.2-2 of 3GPP TS 36.211) below.

TABLE (1)

| UL-DL Configuration Number | DL-to-UL Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table (1), for each subframe in a radio frame, "D" indicates that the subframe is reserved for DL transmissions, "U" indicates that the subframe is reserved for UL transmissions and "S" indicates a special subframe with three fields: a downlink pilot time slot (DwPTS), a guard period (GP) and an UL pilot time slot (UpPTS). The lengths of DwPTS, GP and UpPTS are given in Table (2) (from Table 4.2-1 of 3GPP TS 36.211) subject to the total length of DwPTS, GP and UpPTS being equal to $30720 \cdot T_s = 1$ ms. Table (2) illustrates several configurations of (standard) special subframes. Each subframe i is defined as two slots, 2i and 2i+1 of length $T_{slot} = 15360 \cdot T_s = 0.5$ ms in each subframe. In Table (2), "cyclic prefix" is abbreviated as "CP" and "configuration" is abbreviated as "Config" for convenience.

TABLE (2)

| | Normal CP in downlink | | | Extended CP in downlink | | |
|---|---|---|---|---|---|---|
| | | UpPTS | | | UpPTS | |
| Special Subframe Config | DwPTS | Normal CP in uplink | Extended CP in uplink | DwPTS | Normal CP in uplink | Extended CP in uplink |
| 0 | $6592 \cdot T_S$ | $2192 \cdot T_S$ | $2560 \cdot T_S$ | $7680 \cdot T_S$ | $2192 \cdot T_S$ | $2560 \cdot T_S$ |
| 1 | $19760 \cdot T_S$ | | | $20480 \cdot T_S$ | | |
| 2 | $21952 \cdot T_S$ | | | $23040 \cdot T_S$ | | |
| 3 | $24144 \cdot T_S$ | | | $25600 \cdot T_S$ | | |
| 4 | $26336 \cdot T_S$ | | | $7680 \cdot T_S$ | $4384 \cdot T_S$ | $5120 \cdot T_S$ |

TABLE (2)-continued

| | | Normal CP in downlink | | | Extended CP in downlink | |
|---|---|---|---|---|---|---|
| | | UpPTS | | | UpPTS | |
| Special Subframe Config | DwPTS | Normal CP in uplink | Extended CP in uplink | DwPTS | Normal CP in uplink | Extended CP in uplink |
| 5 | $6592 \cdot T_S$ | $4384 \cdot T_S$ | $5120 \cdot T_S$ | $20480 \cdot T_S$ | | |
| 6 | $19760 \cdot T_S$ | | | $23040 \cdot T_S$ | | |
| 7 | $21952 \cdot T_S$ | | | — | — | — |
| 8 | $24144 \cdot T_S$ | | | — | — | — |

UL-DL configurations with both 5 ms and 10 ms DL-to-UL switch-point periodicity are supported. In the case of 5 ms DL-to-UL switch-point periodicity, the special subframe exists in both half-frames. In the case of 10 ms DL-to-UL switch-point periodicity, the special subframe exists in the first half-frame only. Subframes 0 and 5 and DwPTS may be reserved for DL transmission. UpPTS and the subframe immediately following the special subframe may be reserved for UL transmission. In a case where multiple cells are aggregated, a UE may assume the same UL-DL configuration across all the cells and that the guard period of the special subframe in the different cells have an overlap of at least $1456 \cdot T_s$.

The (default) UL-DL configuration may be a part of a SystemInformationBlockType1 (SIB1), defined by an information element (IE) TDD-Config, which includes a subframe assignment and specialSubframePatterns. The SIB1 may be transmitted on a broadcast control channel as a logical channel. To change the UL-DL configuration, a system information change procedure may be performed.

Some TDD configuration and reconfiguration issues are described as follows. A TDD configuration does not require paired frequency bands. Thus, one advantage of a TDD configuration is the flexibility of bandwidth allocation. In LTE-TDD, a frame may have 10 subframes. UL-DL configurations with both 5 ms and 10 ms DL-to-UL switch-point periodicity may be supported. Seven UL-DL configurations are specified in 3GPP standards. In Release 10 and earlier specifications, to avoid interference between UL and DL transmissions, system-wide synchronization may be necessary. Therefore, all evolved Node Bs (eNBs) and all UEs may follow the same UL-DL configuration and timing (in accordance with Release 10 and earlier specifications, for example).

In current specifications (e.g., LTE Releases 8, 9 and 10), a system information change procedure may be used to change the UL-DL configuration. This procedure requires multiple broadcast channel intervals and thus has a long delay and cannot adapt to an instantaneous traffic load change. Examples of UL-DL associations (in LTE-TDD, for instance) include the association of a PDCCH for UL power control of an UL subframe, association of a PDCCH for physical uplink shared channel (PUSCH) allocation in an UL subframe, associations of ACK/NACK feedback of DL transmission on UL subframe(s), ACK/NACK feedback of UL transmission on PHICH or PDCCH, etc. Due to different UL-DL associations, all transmitters may have to turn off the transmissions altogether to disconnect the UL-DL associations of the old configuration and to set up the new associations.

This may cause a huge loss of system capacity (e.g., offered load on uplink or downlink) and user traffic interruption. Thus, the reconfiguration of UL and DL allocation may also be very costly. Furthermore, a change in one cell may force adjacent cells to change their UL-DL configurations. Thus, a "ripple" effect may occur. With high traffic load fluctuation, frequent UL-DL reconfiguration may cause serious network problems.

The LTE TDD UL-DL configuration is designed for aggregated network traffic flow. The traffic characteristics of each application and/or each UE may be significantly different. Statistically, the network traffic load (e.g., the aggregated traffic load of all UEs in a cell) should be relatively stable and change more gradually compared with the traffic characteristics of an individual UE. However, the aggregated traffic load may also fluctuate a lot around an average value. The average traffic load at a different time of the day can vary significantly. The UL and DL ratio may change significantly when some UEs use high bandwidth applications like video streaming and large file downloads.

Operators may configure the network with some desired load ratio "target" based on an operator's preference for its revenue model or other objectives. The actual system traffic characteristic may contain two aspects. The first aspect is the total traffic load on either the uplink or downlink to capacity (or offered load) ratio on that link. The second aspect is the UL-to-DL traffic ratio. The UL-to-DL traffic ratio may or may not match an operator's target or desired load ratio (e.g., the ratio of offered load on the uplink to the offered load on the downlink).

When the network aggregated traffic load-to-capacity ratio is low, an UL-DL configuration is acceptable if the UL traffic and DL traffic load can be supported by the allocated UL subframes and DL subframes, respectively. In this case, the actual UL-DL traffic ratio may be the same or different from the UL-DL allocation. On the other hand, if the total traffic load to capacity ratio is high, a better matching UL-DL ratio may be configured.

A reconfiguration may be needed in several cases. For example, a reconfiguration may be needed if the allocated UL resource cannot support the UL traffic load. In another example, reconfiguration may be needed if the allocated DL resource cannot support the DL traffic load. Furthermore, a reconfiguration may be used to adapt to traffic load with a better match UL-DL allocation. For instance, a reconfiguration may be needed if a current UL-DL configuration does not match the UL-to-DL traffic ratio.

Currently, a change of system information procedure may be used for uplink-downlink (UL-DL) reconfiguration. This process is a radio resource control (RRC) layer procedure. It may take a long time and cannot be adjusted to instantaneous or rapidly fluctuating traffic load changes. The instantaneous traffic load change may be temporary. By the time the network configuration is changed, the traffic load may have already changed back to the normal state. Thus, another reconfiguration may be needed.

Even worse (with Release-8, 9 and 10, for example), a change of UL-DL configuration in one cell may trigger the change of UL-DL configurations in adjacent cells, since the TDD system is designed to have the same UL-DL configuration to avoid interference between DL and UL transmissions. Therefore, changing an UL-DL configuration (using a change of system information) may be very costly at the RRC level, and may be beneficially avoided in some cases.

In order to better adapt to traffic conditions, dynamic UL-DL reconfiguration procedures may be supported besides the system information change. Dynamic UL-DL reconfiguration may maintain backward compatibility (for legacy UEs, for example) and provide more flexibility (for UEs operating in accordance with Release 11 specifications and beyond, for example) with fast subframe modifications based on real-time traffic changes. Furthermore, different UL-DL configurations in neighboring cells may be supported (in Release 11, for example) in a temporary or persistent manner with co-channel interference mitigation techniques. The different UL-DL configurations may be caused by different initial network configurations and/or by dynamic UL-DL configuration changes with traffic adaptation.

Dynamic UL-DL reconfiguration support may be determined implicitly or explicitly. In some configurations, a system information block (SIB) or higher layer signaling (e.g., RRC signaling), may be used to configure or to enable or disable dynamic UL-DL reconfiguration by the eNB. For example, the eNB may send explicit signaling (e.g., a SIB or RRC signaling) to indicate to a UE that at least one subframe is convertible over a default TDD UL-DL configuration. Additionally or alternatively, the signaling of one or more reference UL-DL configurations or a dynamic UL-DL reconfiguration range may implicitly indicate the support of dynamic UL-DL reconfiguration. For example, the eNB may send a dynamic UL-DL reconfiguration range to the UE that implicitly indicates that at least one subframe is convertible over a default TDD UL-DL configuration. The dynamic UL-DL reconfiguration support may be signaled (e.g. configured) by an eNB as cell-specific, to a group of UEs or as UE-specific.

More detail regarding separate PDSCH and PUSCH timings for dynamic TDD UL-DL reconfiguration is given hereafter. In Releases 8, 9 and 10, the TDD UL-DL associations on PDSCH HARQ-ACK, PUSCH scheduling and PUSCH HARQ-ACK are defined by the TDD UL-DL configuration. All legacy UEs in the network follow the same PDSCH HARQ-ACK report associations defined by the given TDD UL-DL configuration. Similarly, all legacy UEs in the network follow the same PUSCH scheduling and PUSCH HARQ-ACK report associations defined by the given TDD UL-DL configuration.

However, the systems and methods disclosed herein provide an approach that may separate PDSCH and PUSCH timing associations based on different reference UL-DL configurations. For example, a network (e.g., one or more UEs and one or more eNBs) may be configured to allow dynamic TDD UL-DL reconfiguration based on traffic adaptation (besides the default UL-DL configuration as in Release 8, 9 and 10 specifications). For instance, a UE that is configured to allow dynamic UL and DL reconfiguration may utilize one reference UL-DL configuration for PDSCH HARQ-ACK association and another reference UL-DL configuration for PUSCH scheduling and PUSCH HARQ-ACK association, while the UE has knowledge of a default UL-DL configuration.

The reference UL-DL configuration for PDSCH HARQ-ACK association and the reference UL-DL configuration for PUSCH scheduling and PUSCH HARQ-ACK association may or may not be the same. Which reference UL-DL configurations are utilized may be explicitly indicated (e.g., defined) by RRC signalling or derived implicitly from other information (e.g., an allowed dynamic UL-DL reconfiguration range). If reference UL-DL configurations are indicated by RRC signalling, the allowed dynamic UL-DL reconfiguration range may not need to be identified by a UE or an eNB. The allowed dynamic UL-DL reconfiguration range may be derived from the default UL-DL configuration and the reference UL-DL configurations. The reference UL-DL configurations may be cell-specific or UE-specific UL-DL configurations.

If necessary, the allowed dynamic UL-DL reconfiguration range may be provided by the eNB (via RRC signalling, for example). The allowed dynamic UL-DL reconfiguration range may be cell-specific or UE-specific.

The dynamic UL-DL reconfiguration range may be defined in association with the seven standard UL-DL configurations given in 3GPP specifications. The dynamic UL-DL reconfiguration range may also be defined according to the number of UL and/or DL subframe conversions allowed from the default UL-DL configuration. The dynamic UL-DL reconfiguration range may additionally or alternatively be defined by the reference UL-DL configuration for PDSCH HARQ-ACK and reference UL-DL configuration for PUSCH scheduling and HARQ-ACK by RRC signalling.

A default UL-DL configuration may be an UL-DL configuration specified by an eNB for all UEs. For a given default TDD UL-DL configuration, the dynamic UL-DL reconfiguration range may be any combination of the seven standard TDD UL-DL configurations, provided that the default UL-DL configuration is within the reconfiguration range. Thus, it is possible to dynamically reconfigure the network between a 10 ms periodicity UL-DL configuration and a 5 ms periodicity UL-DL configuration. However, it should be noted that a TDD UL-DL configuration periodicity change is very significant. Thus, the dynamic UL-DL reconfiguration may be limited to configurations with the same periodicity in some implementations of the systems and methods disclosed herein.

Based on the dynamic UL-DL reconfiguration range, the UL subframes and DL subframes can be divided into two groups: a group of subframes with fixed UL or DL directions, and a group of convertible subframes that allow dynamic UL and DL switching. A convertible subframe may also be referred to as a reconfigurable subframe. A subframe has a fixed direction if it maintains the same UL or DL direction in the dynamic UL-DL reconfiguration range. A subframe is a convertible subframe if it is an UL subframe in at least one case and is a DL subframe in at least one other case in the dynamic UL-DL reconfiguration range. In other words, a convertible subframe is a subframe that allows a direction change in the dynamic UL-DL reconfiguration range. In some implementations, a UE may determine convertible subframes based on the dynamic UL-DL reconfiguration range (by determining those subframes that are different between the UL-DL configurations in the dynamic UL-DL reconfiguration range, for example). The convertible subframe may be indicated (e.g., defined) explicitly by RRC signalling (to a UE) or derived implicitly (by the UE) from other information (e.g., allowed dynamic UL-DL reconfiguration range and/or reference UL-DL configurations and/or a default UL-DL configuration). Convertible subframes may be within a convertible region.

When deriving the fixed subframes and convertible subframes, a (standard) special subframe may be treated as a DL subframe, and a special subframe type 2 may be treated as an UL subframe. More detailed examples are given below in connection with the Figures.

One example has TDD UL-DL configuration 1 as the default UL-DL configuration, and an allowed UL-DL reconfiguration range from UL-DL configuration 2 to UL-DL configuration 0. In this example, the UE and the eNB know the reference UL-DL configuration for PDSCH HARQ-ACK as configuration 2 and the reference UL-DL configuration for PUSCH scheduling and PUSCH HARQ-ACK as configuration 0. Thus, this example illustrates different reference UL-DL configurations for dynamic TDD UL-DL reconfiguration. Additional detail is given in connection with FIG. 8 below.

Another example has a mixed periodicity with the default UL-DL configuration as configuration 4, where the dynamic UL-DL reconfiguration range is between UL-DL configuration 4 and UL-DL configuration 1. In this example, the convertible subframes or reconfigurable subframes are subframes 7 and 8. The first reference UL-DL configuration is configuration 4, which has a minimum number of UL subframes. The second reference UL-DL configuration is configuration 1, which has a minimum number of DL subframes. If a PUSCH is scheduled for a Release 11 UE in subframe 7, then subframe 7 may be converted to an UL subframe. More specifically, since subframe 6 is a regular DL subframe, subframe 7 may be converted to a special subframe type 2. Thus, the Physical Uplink Control Channel (PUCCH) in a converted subframe 7 is maintained, and the PUSCH scheduling and HARQ-ACK reporting for legacy UEs can still be performed. If a PUSCH is scheduled for a Release 11 UE in subframe 8, the UE may assume that subframe 7 is already converted to a special subframe type 2, and use subframe 8 as a normal UL subframe. Thus, this example illustrates a reconfiguration range with mixed periodicity. Additional detail is given below in connection with FIG. 9.

When the allowed dynamic UL-DL reconfiguration range is configured (e.g., established) for a Release 11 UE or when the reference UL-DL configurations are configured (e.g., established) for the UE, the UE may determine (e.g., set) the reference UL-DL configuration for PDSCH HARQ-ACK reporting and the reference UL-DL configuration for PUSCH scheduling and HARQ-ACK reporting. The reference UL-DL configuration for PDSCH HARQ-ACK association and the reference UL-DL configuration for PUSCH scheduling and PUSCH HARQ-ACK association may or may not be the same. The reference UL-DL configurations may be derived from the allowed reconfiguration range.

The PDSCH HARQ-ACK associations are used to report ACK/NACK bits of a PDSCH transmission on the PUCCH or the PUSCH of an UL subframe. To ensure that the same PDSCH HARQ-ACK timing can be used across the allowed reconfiguration range, a first reference UL-DL configuration may be derived as a standard UL-DL configuration with minimum number of UL subframes in the allowed dynamic UL-DL reconfiguration range. In other words, the first reference UL-DL configuration may be determined (e.g., obtained) by finding a standard UL-DL configuration that has the same or smaller number of UL subframes when the convertible subframes are used as DL subframes. The UE may then follow the PDSCH HARQ-ACK timing of the first reference UL-DL configuration. The UE may also follow the PDSCH HARQ-ACK timing of the first reference UL-DL configuration for all configurations within the allowed dynamic UL-DL reconfiguration range. The first reference UL-DL configuration may or may not be the same as the default UL-DL configuration.

The PUSCH scheduling and PUSCH HARQ-ACK reporting are carried on DL subframes. The PUSCH is scheduled by a PDCCH, and PUSCH HARQ-ACK is indicated on either a PHICH or a PDCCH. To ensure the same PUSCH scheduling and PUSCH HARQ-ACK reporting timing can be used across the allowed UL-DL reconfiguration range, a second reference UL-DL configuration may be derived as the configuration with the minimum number of DL subframes in the allowed dynamic UL-DL reconfiguration range. In other words, the second reference UL-DL configuration may be determined (e.g., obtained) by finding a standard UL-DL configuration that has the same or smaller number of DL subframes when convertible subframes are used as ULs. The UE may then follow the PUSCH scheduling and PUSCH HARQ-ACK timing of the second reference UL-DL configuration for all UL-DL configurations within the allowed dynamic UL-DL reconfiguration range. The second reference UL-DL configuration may or may not be the same as the default UL-DL configuration.

For a subframe that allows UL and DL switching, explicit or implicit rules may be defined to decide the UL or DL direction. One example of an approach for a UE to determine the direction of a convertible subframe is given as follows. In this example, a UE (that operates in accordance with Release 11 specifications and beyond, for instance) that is configured with dynamic UL and DL reconfiguration may first assume a direction of a convertible subframe as the direction of the default UL-DL configuration.

For DL-to-UL conversion, if the UE receives a PDCCH to schedule a PUSCH for a convertible subframe with a default DL direction, the DL may be converted to an UL subframe (or to a special subframe type 2 in some cases). If a convertible subframe is immediately after a DL subframe (which happens with a mixed 5 ms and 10 ms UL-DL configuration range), the convertible subframe may be converted into a special subframe type 2. If a convertible subframe is associated with PUSCH scheduling and/or PUSCH HARQ-ACK reporting with the default UL-DL configuration, the convertible subframe may be converted into a special subframe type 2. Furthermore, if a subframe is converted from a DL subframe to an UL subframe for a UE, and the subframe is not the first convertible subframe in a convertible region after a special subframe or DL subframe, all convertible subframes in the given convertible region and in front of the given convertible subframe may also be treated as UL subframes by the UE.

For UL-to-DL subframe conversion, if the UE does not receive a PDCCH to schedule a PUSCH for a convertible subframe with a default UL direction, the UE may monitor the convertible subframe as a DL subframe. Additionally or alternatively, a PDSCH in a convertible subframe with a default UL direction may also be scheduled explicitly by cross-subframe (or cross-transmission time interval (TTI)) PDSCH allocation with a PDCCH or enhanced PDCCH (ePDCCH) in another DL subframe. The same DL subframe used for the PUSCH scheduling may be used to schedule a PDSCH transmission in the convertible subframe instead. Other DL subframes before the given convertible subframe may also be used for cross-subframe scheduling of PDSCH transmission on the given convertible subframe. Moreover, if a subframe is converted from an UL to a DL for a UE and the subframe is not the last convertible subframe in a convertible region after a special subframe or DL subframe, all convertible subframes in the given convertible region and after the given convertible subframe may also be treated as DL subframes by the UE.

For UEs (that operate according to Release 11 specification and beyond, for example), the PUSCH scheduling may follow the scheduling timing of the second reference UL-DL configuration by a legacy PDCCH. The PUSCH scheduling may also be performed by enhanced PDCCH (ePDCCH) or cross-subframe (or cross-TTI) PUSCH scheduling, if supported.

A UE (that operates in accordance with Release 11 specification and beyond, for example) with dynamic UL-DL reconfiguration may use the first reference UL-DL configuration timing for the PDSCH HARQ-ACK report on a PUCCH or PUSCH. Thus, all convertible subframes may be included in the corresponding ACK/NACK reporting bits. In one approach, the number of ACK/NACK bits and the bit ordering can be set the same as the first reference UL-DL configuration. Furthermore, discontinuous transmission (DTX) may be indicated for the convertible subframes that are configured as UL subframes. For instance, a DTX bit may be reported if a UE does not receive a PDCCH correctly in a DL subframe. Keeping these bits as DTX may maintain the same number of ACK/NACK bits regardless of whether a DL is converted to UL or not. In another approach, ACK/NACK may follow the bit ordering of the first reference UL-DL configuration, though ACK/NACK bits may not be transmitted for the convertible subframes that are configured as UL subframes. This approach may provide a benefit of a reduction of the ACK/NACK payload by removing the bits in subframes that are converted from DL subframes to UL subframes. Accordingly, this may lead to improved PUCCH performance.

A Release 11 UE with dynamic UL-DL reconfiguration may use the second reference UL-DL configuration timing for PUSCH scheduling and PUSCH HARQ-ACK reporting on a PHICH or a PDCCH. Thus, all convertible subframes may be scheduled for PUSCH scheduling and informed with ACK/NACK feedback on a PHICH or a PDCCH according to the association rules defined by the second reference UL-DL configuration.

A legacy UE may assume no HARQ-ACK and scheduling timing change. Thus, a Release 11 UE with dynamic UL-DL reconfiguration may have the same PDSCH HARQ-ACK timing, PUSCH scheduling and/or HARQ-ACK timing as legacy UEs. Alternatively, a Release 11 UE with dynamic UL-DL reconfiguration may have PDSCH HARQ-ACK timing PUSCH scheduling and/or HARQ-ACK timing that is different from legacy UEs. However, the eNB may schedule legacy UEs to avoid any potential conflicts.

If a convertible subframe is a DL subframe in the default UL-DL configuration and is converted to an UL subframe, the convertible subframe may immediately follow an UL subframe or another convertible subframe that is already converted to an UL subframe. Legacy UEs that are not aware of the conversion may still try to decode the converted UL subframe as a DL subframe. Since no PDCCH may be detected, legacy UEs may report a DTX for the given subframe.

However, in some cases, the given convertible subframe may be linked (e.g., associated) with PUSCH scheduling or PUSCH ACK/NACK reporting. In one approach, the eNB may avoid scheduling PUSCH transmissions for legacy UEs in the linked (e.g., associated) UL subframes. Thus, the convertible subframe may be used as an UL subframe by Release 11 UEs that are configured with dynamic UL-DL reconfiguration. In another approach, the eNB may still schedule PUSCH transmissions for legacy UEs in the linked (e.g., associated) UL subframes. Furthermore, the convertible subframe may become a special subframe type 2 and be used as an UL subframe for Release 11 UEs that are configured with dynamic UL-DL reconfiguration.

On the other hand, if a convertible subframe is an UL subframe in the default UL-DL configuration and is converted to a DL subframe, the convertible subframe may be the last UL subframe of a UL-DL configuration periodicity or it may be in front of another convertible subframe that is already converted to a DL subframe from the default UL-DL configuration. When an UL subframe is converted to a DL subframe, legacy UEs are not aware of the conversion. Thus, the eNB may not schedule any UL transmission for legacy UEs in such a convertible subframe. However, the given subframe may also be used by legacy UEs to report PDSCH HARQ-ACK. Therefore, the eNB may restrict the PDSCH transmission of legacy UEs in the DL subframes that are linked to (e.g., associated with) the given convertible subframe. It should be noted that these DL subframes may still be used for Release 11 UEs that are configured with dynamic UL-DL reconfiguration because they follow a different PDSCH HARQ-ACK timing based on the first reference UL-DL configuration.

Scheduling constraints may be placed on legacy UEs when dynamic UL-DL reconfiguration is applied. Hereafter, scenarios of dynamic UL-DL reconfiguration with different default UL-DL configurations are described. When a dynamic UL-DL reconfiguration range has the same periodicity for UL-DL configurations with 10 ms periodicity, all dynamic range combinations may be supported. For UL-DL configurations with 5 ms periodicity (besides all combinations of standard UL-DL configurations), some intermediate or transition states may also be supported during the dynamic UL-DL reconfiguration. More details are provided below for each UL-DL configuration when the reconfiguration range has the same periodicity.

When the dynamic UL-DL reconfiguration range has mixed periodicity of 5 ms and 10 ms, an approach similar to the approach described above regarding separate PDSCH and PUSCH timings for dynamic TDD UL-DL reconfiguration may be applied. The eNB may also apply scheduling restrictions to prevent PDSCH allocations that are linked to (e.g., associated with) an UL subframe that is converted to a DL subframe. Furthermore, the eNB may avoid scheduling a PDSCH in a convertible subframe that is converted from a DL subframe to an UL subframe. Detailed information on only some of the possible combinations is given below. Nevertheless, the systems and methods disclosed herein may be applied to all possible combinations.

A radio frame may have a length of 10 ms. One subframe conversion between UL and DL in a radio frame brings a 10% change in each one direction. Network traffic load may not typically change dramatically. Therefore, even though all combinations may be supported by the systems and methods disclosed herein, one or two subframe conversions in a periodicity in each direction (if available) may be sufficient in most cases to manage variations in traffic load.

More specific examples for each UL-DL configuration when the UL-DL reconfiguration range has the same periodicity are given as follows. Each UL-DL configuration described in these examples may refer to the standard TDD UL-DL configuration as specified in Table (1) (e.g., TS 36.211 Table 4.2-2) above.

One example based on UL-DL configuration 5 is given as follows. TDD UL-DL configuration 5 has a 10 ms periodicity and one UL subframe allocation in a radio frame. Thus, no UL-to-DL subframe conversion is possible. If UL-DL configuration 5 is the default UL-DL configuration, for UEs (that operate in accordance with Release 11 specifications and beyond, for instance) that are configured with dynamic UL-DL reconfiguration, the first reference UL-DL configuration may be the default UL-DL configuration 5.

In an approach where only one DL-to-UL conversion is allowed (e.g., the allowed dynamic UL-DL reconfiguration range is between UL-DL configuration 5 and UL-DL configuration 4), the second reference UL-DL configuration may be configuration 4. Thus, if a PDCCH in subframe 9 schedules a PUSCH transmission in subframe 3, subframe 3 is converted from a DL subframe to an UL subframe and no PDCCH or PDSCH may be transmitted in subframe 3.

In an approach where two DL-to-UL subframe conversions are allowed (e.g., the allowed dynamic UL-DL reconfiguration range is between UL-DL configuration 5 and UL-DL configuration 3), the second reference UL-DL configuration may be UL-DL configuration 3. Thus, if a PDCCH in subframe 9 schedules a PUSCH transmission in subframe 3, subframe 3 is converted from a DL subframe to an UL subframe, and no PDCCH or PDSCH will be transmitted in subframe 3. If a UE receives only a PUSCH scheduling in subframe 3, the UE may treat subframe 3 as an UL subframe, even if there is no PUSCH scheduling for it in subframe 3. Therefore, the eNB may only schedule a PUSCH on subframe 4 if subframe 3 is already converted to an UL subframe.

Another example based on UL-DL configuration 3 is given as follows. TDD UL-DL configuration 3 has a 10 ms periodicity and three UL subframe allocations in a radio frame. Thus, no DL-to-UL subframe conversion is possible. If UL-DL configuration 3 is the default UL-DL configuration, for UEs (that operate in accordance with Release 11 specifications and beyond, for instance) that are configured with dynamic UL-DL reconfiguration, the second reference UL-DL configuration may be the default UL-DL configuration 3.

In an approach where only one UL-to-DL subframe conversion is allowed, (e.g., the allowed dynamic UL-DL reconfiguration range is between UL-DL configuration 3 and UL-DL configuration 4), the first reference UL-DL configuration may be configuration 4. If no PUSCH is scheduled in subframe 4, a UE (that operates in accordance with Release 11 specifications and beyond, for instance) may monitor subframe 4 as a DL subframe. Furthermore, if a PDSCH is allocated for a UE (that operates in accordance with Release 11 specifications and beyond, for instance) in subframe 4 by cross-subframe scheduling in a different DL subframe with a PDCCH or an ePDCCH, the UE may monitor subframe 4 as a DL subframe. When subframe 4 is converted from an UL subframe to a DL subframe, for legacy UEs, the eNB may not schedule a PUSCH on subframe 4 and may avoid a PDSCH allocation on subframes 9 and 0 to prevent PDSCH HARQ-ACK reporting on a PUCCH or a PUSCH in subframe 4. It should be noted that subframes 9 and 0 may still be used for UEs (that operate in accordance with Release 11 specifications and beyond, for instance) with dynamic UL-DL reconfiguration support. Thus, the resource may not be wasted.

In an approach where two UL-to-DL subframe conversions are allowed (e.g., the allowed dynamic UL-DL reconfiguration range is between UL-DL configuration 3 and UL-DL configuration 5), the first reference UL-DL configuration may be configuration 5. The eNB may apply some scheduling restrictions when the subframes are converted. When subframe 4 is converted from an UL subframe to a DL subframe, no PUSCH scheduling may occur on subframe 4, and PDSCH allocation on subframes 9 and 0 may be avoided. When both subframes 3 and 4 are converted from UL subframes to DL subframes, no PUSCH scheduling may occur on subframe 3 and 4, and PDSCH allocation on subframes 7, 8, 9 and 0 may be avoided. Additionally, if a UE receives a PDSCH allocated in subframe 3, the UE may treat subframe 4 as a DL subframe. It should be noted that these DL subframes may still be used by UEs (that operate in accordance with Release 11 specifications and beyond, for instance). Thus, the resource may not be wasted.

Another example based on UL-DL configuration 4 is given as follows. TDD UL-DL configuration 4 has a 10 ms periodicity and two UL subframe allocations in a radio frame. UL-DL configuration 4 may be dynamically reconfigured to UL-DL configuration 3 and/or UL-DL configuration 5.

In one approach where only UL-to-DL subframe conversion is allowed, the allowed dynamic UL-DL reconfiguration range may be between UL-DL configuration 4 and UL-DL configuration 5, the first reference UL-DL configuration may be UL-DL configuration 5, and the second reference UL-DL configuration may be UL-DL configuration 4.

In another approach where only DL-to-UL subframe conversion is allowed, the allowed dynamic UL-DL reconfiguration range may be between UL-DL configuration 4 and UL-DL configuration 3, the first reference UL-DL configuration may be configuration 4, and the second reference UL-DL configuration may be configuration 3.

In an approach where both UL-to-DL and DL-to-UL subframe conversions are allowed, the allowed dynamic UL-DL reconfiguration range may be between UL-DL configuration 5 and UL-DL configuration 3, the first reference UL-DL configuration may be UL-DL configuration 5, and the second reference UL-DL configuration may be UL-DL configuration 3.

The eNB may apply some scheduling restrictions on legacy UEs. When subframe 3 is converted from an UL to a DL subframe, no PUSCH scheduling may occur in subframe 3, and PDSCH allocation for legacy UEs in subframes 6, 7, 8, and 9 may be avoided to prevent PDSCH HARQ-ACK reporting on subframe 3. It should be noted that these DL subframes may be used for UEs that operate in accordance with Release 11 specifications and beyond, for instance. Thus, no resource is wasted. When subframe 4 is converted from a DL to an UL subframe, no DL allocation may occur on subframe 4.

Another example based on UL-DL configuration 2 is given as follows. TDD UL-DL configuration 2 has a 5 ms periodicity and two UL subframe allocations in a radio frame. Thus, no UL-to-DL subframe conversion is possible. If UL-DL configuration 2 is the default UL-DL configuration, for Release 11 UEs that are configured with dynamic UL-DL reconfiguration, the first reference UL-DL configuration may be the default UL-DL configuration 2. If one or two DL-to-UL subframe conversions are allowed, the allowed dynamic UL-DL reconfiguration range may be between UL-DL configuration 2 and UL-DL configuration 1 and the second reference UL-DL configuration may be UL-DL configuration 2. If three DL-to-UL subframe conversions are allowed, the allowed dynamic UL-DL reconfiguration range may be between UL-DL configuration 2 and UL-DL configuration 6, the second reference UL-DL configuration may be UL-DL configuration 6. If four DL-to-UL subframe conversions are allowed, the allowed dynamic UL-DL reconfiguration range may be between configuration 2 and configuration 0 and the second reference UL-DL configuration may be UL-DL configuration 0.

With dynamic UL-DL reconfiguration, the eNB may apply some scheduling restrictions on legacy UEs. With one DL-to-UL subframe conversion, subframe 3 may be converted. Thus, no PDSCH may occur on subframe 3. With two DL-to-UL subframe conversions, subframes 3 and 8 may be converted. Thus, no PDSCH may occur on subframes 3 and 8. With three DL-to-UL subframe conversions, subframes 3, 4 and 8 may be converted. Thus, no PDSCH may occur on subframes 3, 4 and 8. With four DL-to-UL subframe conversions, subframes 3, 4, 8 and 9 may be converted. Thus, no PDSCH may occur on subframes 3, 4, 8 and 9. It should be noted that these DL subframes may still be used by UEs that operate in accordance with Release 11 specifications and beyond, for example. Furthermore, subframe 3 and subframe 8 may be used to schedule a PUSCH for legacy UEs. If all of these subframes (e.g., subframes 3, 4, 8 and 9) are converted to regular UL subframes, no PUSCH may be scheduled for legacy UEs. For instance, this may be a worst case scenario that illustrates a need for a special subframe type 2. Therefore, subframe 3 and subframe 8 may be converted to special subframe type 2 subframes. A special subframe type 2 maintains the PDCCH region and allocates PUSCH in the rest of the subframe after a small guard period (GP). Thus, the special subframe type 2 may be used to provide UL transmissions while maintaining existing UL-DL associations.

Another example based on UL-DL configuration 0 is given as follows. TDD UL-DL configuration 0 has a 5 ms periodicity and six UL subframe allocations in a radio frame. Thus, no DL-to-UL conversion is possible. If UL-DL configuration 0 is the default UL-DL configuration, for UEs (that operate in accordance with Release 11 specifications and beyond, for instance) that are configured with dynamic UL-DL reconfiguration, the second reference UL-DL configuration may be the default UL-DL configuration 0. If one UL-to-DL subframe conversion is allowed, the allowed dynamic UL-DL reconfiguration range may be between UL-DL configuration 0 and UL-DL configuration 6 and the first reference UL-DL configuration may be configuration 6. If two UL-to-DL subframe conversions are allowed, the allowed dynamic UL-DL reconfiguration range may be between UL-DL configuration 0 and UL-DL configuration 1 and the first reference UL-DL configuration may be configuration 1. If three or four UL-to-DL subframe conversions are allowed, the allowed dynamic UL-DL reconfiguration range may be between UL-DL configuration 0 and UL-DL configuration 2 and the first reference UL-DL configuration may be configuration 2.

With dynamic UL-DL reconfiguration, the eNB may apply some scheduling restrictions on legacy UEs. With one UL-to-DL subframe conversion, subframe 9 may be converted. The eNB may not schedule a PUSCH in subframe 9 and may avoid PDSCH allocation for legacy UEs on subframe 5 to prevent PDSCH HARQ-ACK reporting in subframe 9. With two UL-to-DL subframe conversions, subframes 4 and 9 may be converted. The eNB may not schedule a PUSCH in subframe 4 and 9 and may avoid PDSCH allocations for legacy UEs on subframes 0 and 5. With three UL-to-DL subframe conversions, subframes 4, 8 and 9 may be converted. The eNB may not schedule a PUSCH in subframe 4, 8 and 9 and may avoid PDSCH allocations for legacy UEs on subframes 0 and 5. With four UL-to-DL subframe conversions, subframes 3, 4, 8 and 9 may be converted. The eNB may not schedule a PUSCH in subframes 3, 4, 8 and 9 and may avoid PDSCH allocations for legacy UEs on subframes 0 and 5.

Another example based on UL-DL configuration 1 is given as follows. TDD UL-DL configuration 1 has a 5 ms periodicity and four UL allocations in a radio frame. Thus, both DL-to-UL and UL-to-DL subframe conversions are possible. If UL-DL configuration 1 is the default UL-DL configuration, for UEs (that operate in accordance with Release 11 specifications and beyond, for instance) that are configured with dynamic UL-DL reconfiguration, the reference UL-DL configuration may be determined based on the allowed dynamic UL-DL reconfiguration range.

If no DL-to-UL subframe conversion and only UL-to-DL subframe conversions are allowed, the allowed dynamic UL-DL reconfiguration range may be between UL-DL configuration 1 and UL-DL configuration 2, the first reference UL-DL configuration may be UL-DL configuration 2 and the second reference UL-DL configuration may be UL-DL configuration 1.

If no UL-to-DL subframe conversion and only one DL-to-UL subframe conversion are allowed, the allowed dynamic UL-DL reconfiguration range may be between UL-DL configuration 1 and UL-DL configuration 6, the first reference UL-DL configuration may be UL-DL configuration 1 and the second reference UL-DL configuration may be UL-DL configuration 6.

If UL-to-DL subframe conversion and only one DL-to-UL subframe conversion are allowed, the allowed dynamic UL-DL reconfiguration range may be between UL-DL configuration 2 and UL-DL configuration 6, the first reference UL-DL configuration may be UL-DL configuration 2 and the second reference UL-DL configuration may be UL-DL configuration 6. If UL-to-DL subframe conversion and two DL-to-UL subframe conversions are allowed, the allowed dynamic UL-DL reconfiguration range may be between UL-DL configuration 2 and UL-DL configuration 0, the first reference UL-DL configuration may be UL-DL configuration 2 and the second reference UL-DL configuration may be UL-DL configuration 0.

With dynamic UL-DL reconfiguration, the eNB may apply some scheduling restrictions on legacy UEs. With one UL-to-DL subframe conversion, subframe 8 may be converted. The eNB may not schedule a PUSCH in subframe 8 and may avoid PDSCH allocation on subframe 4 for legacy UEs to prevent PDSCH HARQ-ACK reporting on subframe 8. With two UL-to-DL subframe conversions, subframes 3 and 8 may be converted. The eNB may not schedule a PUSCH in subframes 3 and 8 and may avoid PDSCH allocation on subframes 4 and 9.

With one DL-to-UL subframe conversion, subframe 4 may be converted. Thus no PDSCH may occur on subframe 4. If a regular UL subframe is used in subframe 4, the eNB may avoid PUSCH scheduling in subframe 8. If a special subframe type 2 is used in the converted subframe 4, PUSCH scheduling in subframe 8 for legacy UEs is possible.

With two DL-to-UL conversions, subframes 4 and 9 may be converted. Thus, no PDSCH may occur on subframes 4 and 9. If a regular UL subframe is used, the eNB may avoid PUSCH scheduling in subframes 3 and 8. If a special subframe type 2 is used in the converted subframe, PUSCH scheduling in subframe 3 and 8 is possible.

Another example based on UL-DL configuration 6 is given as follows. TDD UL-DL configuration 6 has a 5 ms periodicity and five UL subframe allocations in a radio frame. Thus, both DL-to-UL and UL-to-DL subframe conversions are possible. If UL-DL configuration 6 is the default UL-DL configuration, for UEs (that operate in accordance with Release 11 specifications and beyond, for instance) that are configured with dynamic UL-DL reconfiguration, the reference UL-DL configuration may be determined based on the allowed dynamic UL-DL reconfiguration range.

If no DL-to-UL conversion and only one UL-to-DL subframe conversion are allowed, the allowed dynamic UL-DL reconfiguration range may be between UL-DL configuration 6 and UL-DL configuration 1, the first reference UL-DL configuration may be configuration 1 and the second reference UL-DL configuration may be UL-DL configuration 6. If no DL-to-UL subframe conversion and two or three UL-to-DL subframe conversions are allowed, the allowed dynamic UL-DL reconfiguration range may be between UL-DL configuration 6 and UL-DL configuration 2, the first reference UL-DL configuration may be UL-DL configuration 2 and the second reference UL-DL configuration may be UL-DL configuration 6.

If no UL-to-DL subframe conversion and only DL-to-UL subframe conversion is allowed, the allowed dynamic UL-DL reconfiguration range may be between UL-DL configuration 6 and UL-DL configuration 0, the first reference UL-DL configuration may be UL-DL configuration 6 and the second reference UL-DL configuration may be UL-DL configuration 0. If one UL-to-DL subframe conversion and DL-to-UL subframe conversion are allowed, the allowed dynamic UL-DL reconfiguration range may be between UL-DL configuration 1 and UL-DL configuration 0, the first reference UL-DL configuration may be UL-DL configuration 1 and the second reference UL-DL configuration may be UL-DL configuration 0.

If two or three UL-to-DL subframe conversions and DL-to-UL subframe conversion are allowed, the allowed dynamic UL-DL reconfiguration range may be between UL-DL configuration 2 and UL-DL configuration 0, the first reference UL-DL configuration may be UL-DL configuration 2 and the second reference UL-DL configuration may be UL-DL configuration 0.

With dynamic UL-DL reconfiguration, the eNB may apply some scheduling restrictions on legacy UEs. With one UL-to-DL subframe conversion, subframe 4 may be converted. The eNB may not schedule a PUSCH in subframe 4 and may avoid PDSCH allocation on subframe 9 for legacy UEs to prevent PDSCH HARQ-ACK reporting on subframe 8. With two UL-to-DL subframe conversions, subframes 4 and 8 may be converted. The eNB may not schedule a PUSCH in subframes 4 and 8 and may avoid PDSCH allocation on subframes 9 and 1. With three UL-to-DL subframe conversions, subframes 3, 4 and 8 may be converted. The eNB may not schedule a PUSCH in subframes 3, 4 and 8 and may avoid PDSCH allocation on subframes 6, 9 and 1. With one DL-to-UL subframe conversion, subframe 9 may be converted. Thus, no PDSCH may occur on subframe 9. If a regular UL subframe is used, the eNB may avoid PUSCH scheduling for legacy UEs in subframe 4. If a special subframe type 2 is used in the converted subframe, PUSCH scheduling in subframe 4 is possible.

More detail regarding dynamic UL-DL subframe conversion with cross-subframe PDSCH scheduling is given hereafter. The systems and methods described herein allow dynamic DL-to-UL subframe conversion by physical layer signalling. The network (e.g., eNB) can keep the same PDSCH HARQ-ACK, PUSCH scheduling and PUSCH HARQ-ACK timing as the default UL-DL configuration. However, extra PHY signalling may be used in accordance with the systems and methods disclosed herein. If an eNB schedules a PUSCH transmission in a DL subframe, the DL subframe may be converted to an UL subframe or to a special subframe type 2. The systems and methods disclosed herein also allow UL-to-DL subframe conversion.

In Release 8, 9 and 10 specifications, the PUSCH scheduling of a UL subframe is associated to a defined scheduling DL subframe (e.g., the PUSCH is scheduled in a cross-subframe manner with a specified distance based on the TDD UL-DL configuration). The distance may be greater than or equal to 4 ms. The target DL subframe may be converted to an UL subframe or to a special subframe type 2 if the new scheduling DL subframe schedules a PUSCH transmission in the target subframe.

In Release 11, cross-subframe or cross-TTI scheduling may be supported for PUSCH scheduling in a different DL subframe. Thus, the extra PHY layer signalling for DL-to-UL subframe conversion may use cross-subframe or cross-TTI PUSCH scheduling to convert a DL-to-UL. With cross-carrier PUSCH scheduling, the distance between the scheduling DL subframe and the target DL subframe for conversion may be greater than or equal to 4 ms. This may provide more flexibility. Furthermore, the cross-TTI scheduling in Release 11 may be performed in a PDCCH or an enhanced PDCCH (ePDCCH), if defined. The cross-TTI scheduling may be achieved by applying different subframe offset values in the PDCCH or ePDCCH.

In Release 8, 9 and 10 specifications, cross-TTI scheduling of a PDSCH transmission is not allowed. However, the systems and methods disclosed herein may add additional physical layer signalling to dynamically convert an UL subframe to a DL subframe (for Release-11 specifications). The additional signalling supports cross-subframe or cross-TTI scheduling for PDSCH transmission (e.g., a PDCCH in a scheduling DL subframe may be used to schedule a PDSCH transmission in another subframe after the scheduling DL subframe). The cross-TTI scheduling may be supported by a PDCCH or an ePDCCH in Release 11 specifications and beyond.

Because an UL subframe is already associated with a scheduling DL subframe for PUSCH scheduling, the same scheduling subframe may be used as the scheduling subframe to convert an UL subframe into a DL subframe. If no PUSCH is scheduled in a cross-TTI, a PDSCH may be scheduled by a PDCCH of a scheduling subframe for a PDSCH in an UL subframe, where the UL subframe may be converted to a DL subframe. Moreover, other DL subframes before the given UL subframe may also be used as the scheduling subframe to schedule a cross-subframe PDSCH on the given UL subframe to convert it into a DL subframe. The cross-TTI scheduling may be achieved by applying different subframe offset values in the PDCCH or ePDCCH.

However, if an UL subframe is converted to a DL subframe, the eNB may not able to schedule a PDSCH on the DL subframes that are associated with the given UL subframe for PUSCH HARQ-ACK. Therefore, some timing changes may be introduced to better use the PHY layer signalling in accordance with the systems and methods disclosed herein as described above.

Some physical (PHY) layer UL-DL reconfiguration considerations (using a special subframe type 2) are detailed hereafter. Considering real-time traffic load fluctuations, a more flexible time domain UL-DL reconfiguration may follow the characteristics of the traffic fluctuations. Thus, a PHY layer reconfiguration may be supported besides the system information change procedure. The PHY layer procedure may deal with most temporary traffic load fluctuations. The system information change procedure may be used only when the traffic change is very significant and the PHY layer procedure cannot handle the change.

The dynamic UL-DL reconfiguration may provide fast subframe conversion with PHY layer signalling. The PHY signalling may be an extension of existing signalling of UL-DL associations, so that backward compatibility can be maintained for legacy UEs. Therefore, current UL-DL associations may not be changed, and dynamic UL-DL reconfiguration may provide extra flexibility and features to Release 11 UEs.

The eNB may have full control of channel resources and UE behavior. Several downlink control information (DCI) formats are specified to carry different control information. For example, DCI format 0 is used for the scheduling of a physical uplink shared channel (PUSCH). DCI format 1 is used for the scheduling of physical downlink shared channel (PDSCH) codeword. Furthermore, DCI format 3 is used for the transmission of transmit power control (TPC) commands for a physical uplink control channel (PUCCH) and physical uplink shared channel (PUSCH) with a two-bit power adjustment.

In an UL subframe in LTE-TDD, only the UEs that have scheduled PUCCH and/or PUSCH transmissions may transmit on the channel. Other UEs may not sense the channel. For downlink data transmission, the PUSCH may be scheduled only by the PDCCH of the same subframe. Therefore, dynamically changing an UL subframe to a DL subframe at the PHY layer is not feasible with existing PHY layer signalling.

In a DL subframe, a UE should monitor the physical downlink control channel (PDCCH) and try to decode the PDCCH. The PHY layer procedure may be extended by a PDCCH to allocate PUSCH transmissions in a standard DL subframe. Such a PDCCH command may be treated as an error in Rel-10 and previous TDD systems.

Extended PHY layer signalling may be used to dynamically convert a DL subframe to allow UL PUSCH transmission. Thus, DL-to-UL subframe conversion may be controlled dynamically by PHY layer signalling. All legacy UEs (e.g., UEs that conform to 3GPP Releases 8, 9 and/or 10) may still designate the subframe as a DL subframe and monitor it for a PDCCH. In case a PDCCH is not present, they may assume a discontinuous transmission (DTX) in the given subframe. Other UEs that support dynamic subframe conversion may use the given subframe as an UL subframe following the PHY layer signalling.

When dynamic UL and DL reconfiguration (e.g., conversion) is applied, it may be desirable to maintain all existing UL-DL associations (according to earlier 3GPP releases, for example). The systems and methods disclosed herein extend the special subframe of the current specifications for temporary and/or partial DL-to-UL conversion. The special subframe extension or new special subframe disclosed herein may be referred to as a "special subframe type 2" or "S2." Additionally or alternatively, the new special subframe or special subframe type 2 may be referred to as a hybrid subframe, flexible subframe, extensible special subframe, etc. More detail concerning the special subframe type 2 are given in connection with FIG. 6 below.

Various configurations are now described with reference to the Figures, where like reference numbers may indicate functionally similar elements. The systems and methods generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of an evolved Node B (eNB) 160 and one or more User Equipments (UEs) 102 in which systems and methods for reconfiguring uplink and downlink allocations may be implemented. It should be noted that the phrase "uplink and downlink" may be referred to as "uplink-downlink" or "UL-DL" for convenience herein. The one or more UEs 102 communicate with an evolved Node B (eNB) 160 using one or more antennas 122a-b. For example, a UE 102 transmits electromagnetic signals to the eNB 160 and receives electromagnetic signals from the eNB 160 using the one or more antennas 122a-b. The eNB 160 communicates with the UE 102 using one or more antennas 180a-b. It should be noted that the eNB 160 may be a Node B, home evolved Node B (HeNB) or other kind of base station in some implementations.

The UE 102 and the eNB 160 may use one or more channels 119, 121 to communicate with each other. For example, a UE 102 may transmit information or data to the eNB 160 using one or more UL channels 121. Examples of UL channels 121 include a physical uplink control channel (PUCCH) and a physical uplink shared channel (PUSCH), etc. The eNB 160 may also transmit information or data to the one or more UEs 102 using one or more downlink channels 119, for instance. Examples of downlink channels 119 include a physical downlink control channel (PDCCH), a physical downlink shared channel (PDSCH), etc. Other kinds of channels may be used.

Each of the one or more UEs 102 may include one or more transceivers 118, one or more demodulators 114, one or more decoders 108, one or more encoders 150, one or more modulators 154 and a UE operations module 124. For example, one or more reception and/or transmission paths may be used in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be used depending on the implementation.

The transceiver 118 may include one or more receivers 120 and one or more transmitters 158. The one or more receivers 120 may receive signals from the eNB 160 using one or more antennas 122a-b. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-b. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 110a-b. For example, a first UE-decoded signal 110a may comprise received payload data 104. A second UE-decoded signal 110b may comprise overhead data and/or control data. For example, the second UE-decoded signal 110b may provide data that may be used by the UE operations module 124 to perform one or more operations.

As used herein, the term "module" may mean that a particular element or component may be implemented in hardware, software or a combination of hardware and software. For example, the UE operations module 124 may be implemented in hardware, software or a combination of both.

In general, the UE operations module 124 may enable the UE 102 to communicate with the eNB 160. The UE operations module 124 may include a UE UL-DL reconfiguration module 132 and a schedule 106. The UE UL-DL reconfiguration module 132 may include one or more of communication configurations B 148*b*, a special subframe type 2 structure 130*b*, one or more convertible regions 107, a dynamic UL-DL reconfiguration range 196, reference (abbreviated as "Ref." for convenience in FIG. 1) UL-DL configuration A 139*a* and reference UL-DL configuration B 139*b*.

The UE UL-DL reconfiguration module 132 may reconfigure an UL-DL allocation (for the UE 102). For example, the eNB 160 may communicate with the UE 102 using a frame structure that includes subframes. Configurations B 148*b* may specify a number and type of subframes (e.g., UL subframes, DL subframes, standard special subframes, special subframe type 2 subframes, etc.) used. For example, configurations B 148*b* may include standard subframe configurations 0-6 as illustrated in Table (1) above in accordance with 3GPP Releases 8-10. In some implementations, configurations B 148*b* may additionally include other configurations (e.g., transitional states or configurations). Configurations B 148*b* included in the UE 102 may correspond to configurations A 148*a* included in the eNB 160. More detail on configurations 148*a-b* is given below.

The one or more convertible regions 107 may include information regarding a designated set of convertible subframes. For example, the convertible region(s) 107 may specify DL subframes that are allowed to be converted to uplink subframes and uplink subframes that are allowed to be converted to DL subframes.

In some implementations, the UE UL-DL reconfiguration module 132 may use special subframe type 2 structure B 130*b* to convert a DL subframe into a special subframe type 2. For example, special subframe type 2 structure B 130*b* may specify the structure of the special subframe type 2 in certain circumstances. For instance, the structure of the special subframe type 2 may vary depending on whether an association corresponds to a target DL subframe (e.g., the DL subframe to be converted), depending on whether an UL or DL subframe immediately precedes the target DL subframe and/or depending on a length of a PDCCH that may (or may not) be included in the special subframe type 2.

For Release 11 UEs 102, PDSCH HARQ-ACK timing may be based on reference UL-DL configuration A 139*a*, while PUSCH scheduling and PUSCH HARQ-ACK timing may be based on reference UL-DL configuration B 139*b*. For example, the PDSCH HARQ-ACK configuration may follow reference UL-DL configuration A 139*a* with a minimum number of UL subframes in the allowed dynamic UL-DL reconfiguration range 196. Reference UL-DL configuration A 139*a* may or may not be the same as a default UL-DL configuration.

The PUSCH scheduling and PUSCH HARQ-ACK timing may follow a reference UL-DL configuration B 139*b* with a maximum number of UL subframes in the allowed dynamic UL-DL reconfiguration range 196. Reference UL-DL configuration B 139*b* may or may not be the same as a default UL-DL configuration.

For subframes with allowed UL-DL switching (e.g., subframes in one or more convertible regions 107), systems and methods are provided herein for signalling and UE 102 behaviors when dynamic UL-DL reconfiguration is utilized.

For example, the UE UL-DL reconfiguration module 132 may determine whether to reconfigure (e.g., switch) the direction (e.g., UL or DL) of one or more subframes in one or more convertible regions 107. This determination may be made based on a default configuration (from configurations B 148*b*) and the schedule 106 that specifies whether a subframe should be an UL or DL subframe. One example of an approach is described in connection with FIG. 5 below.

As described above, PDSCH and PUSCH timing associations may be based on separate reference UL-DL configurations (e.g., reference UL-DL configuration A 139*a* and reference UL-DL configuration B 139*b*). For example, the UEs 102 and the eNB 160 may be configured to allow dynamic TDD UL-DL reconfiguration based on traffic adaptation (besides the UL-DL reconfiguration as in Release 8, 9 and 10 specifications that requires a system information change). For instance, the UE 102 may utilize reference UL-DL configuration A 139*a* for PDSCH HARQ-ACK association and reference UL-DL configuration B 139*b* for PUSCH scheduling and PUSCH HARQ-ACK association, while the UE 102 has knowledge of a default UL-DL configuration. Reference UL-DL configuration A 139*a* for PDSCH HARQ-ACK association and reference UL-DL configuration B 139*b* for PUSCH scheduling and PUSCH HARQ-ACK association may or may not be the same. It should be noted that the eNB 160 may signal a default UL-DL configuration to the UE 102.

In some implementations, which reference UL-DL configurations 139*a-b* are utilized may be explicitly indicated (e.g., defined) by RRC signaling from the eNB 160 or derived implicitly from other information (e.g., from the allowed dynamic UL-DL reconfiguration range 196). If reference UL-DL configurations A-B 139*a-b* are indicated by RRC signalling, the allowed dynamic UL-DL reconfiguration range 196 may not need to be identified by a UE 102 or an eNB 160 via signalling. In this case, the allowed dynamic UL-DL reconfiguration range 196 may be derived from the default UL-DL configuration and the reference UL-DL configurations 139*a-b*. The reference UL-DL configurations 139*a-b* may be cell-specific or UE-specific UL-DL configurations.

In some implementations, the allowed dynamic UL-DL reconfiguration range 196 may be provided by the eNB 160 (via RRC signalling, for example). The allowed dynamic UL-DL reconfiguration range 196 may be cell-specific or UE-specific.

The dynamic UL-DL reconfiguration range 196 may be defined in association with the seven standard UL-DL configurations 148 given in 3GPP specifications. The dynamic UL-DL reconfiguration range 196 may also be defined according to the number of UL and/or DL subframe conversions allowed from the default UL-DL configuration. The dynamic UL-DL reconfiguration range 196 may additionally or alternatively be defined by reference UL-DL configuration A 139*a* for PDSCH HARQ-ACK and reference UL-DL configuration B 139*b* for PUSCH scheduling and HARQ-ACK by RRC signaling from the eNB 160.

The UE operations module 124 may provide information 184 to the one or more receivers 120. For example, the UE operations module 124 may inform the receiver(s) 120 when or when not to receive transmissions based on a current UL-DL configuration 148*b* and/or the schedule 106.

The UE operations module 124 may provide information 138 to the demodulator 114. For example, the UE operations module 124 may inform the demodulator 114 of a modulation pattern anticipated for transmissions from the eNB 160.

In some implementations, this may be based on a current UL-DL configuration 148b and/or the schedule 106.

The UE operations module 124 may provide information 136 to the decoder 108. For example, the UE operations module 124 may inform the decoder 108 of an anticipated encoding for transmissions from the eNB 160. In some implementations, this may be based on a current UL-DL configuration 148b and/or the schedule 106.

The UE operations module 124 may provide information 142 to the encoder 150. The information 142 may include data to be encoded and/or instructions for encoding. For example, the UE operations module 124 may instruct the encoder 150 to encode transmission data 146 and/or control information 142 based on a current UL-DL configuration 148b and/or the schedule 106.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. In some implementations, this may be based on a current UL-DL configuration 148b and/or schedule 106. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. In some implementations, this may be based on a current UL-DL configuration 148b and/or schedule 106. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. In some implementations, this may be based on a current UL-DL configuration 148b and/or schedule 106. For instance, the one or more transmitters 158 may transmit during a DL subframe that has been converted to a special subframe type 2. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113 and an eNB operations module 182. For example, one or more reception and/or transmission paths may be used in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be used depending on the implementation.

The transceiver 176 may include one or more receivers 178 and one or more transmitters 117. The one or more receivers 178 may receive signals from the UE 102 using one or more antennas 180a-b. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-b. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 168a-b. For example, a first eNB-decoded signal 168a may comprise received payload data 162. A second eNB-decoded signal 168b may comprise overhead data and/or control data. For example, the second UE-decoded signal 168b may provide data that may be used by the eNB operations module 182 to perform one or more operations.

The eNB operations module 182 may include an eNB UL-DL reconfiguration module 128 and a scheduling module 164. The eNB UL-DL reconfiguration module 128 may reconfigure subframe allocations. For example, the eNB UL-DL reconfiguration module 128 may switch between configurations A 148a and/or may allocate or de-allocate (e.g., add or remove) certain subframes for communication.

The eNB UL-DL reconfiguration module 128 may include one or more legacy restrictions 134, one or more configurations A 148a, a signalling module 194, a (network) traffic monitoring module 126 and a special subframe type 2 structure A 130a. The configurations A 148a may specify a number and type of subframes (e.g., UL subframes, DL subframes, standard special subframes, special subframe type 2 subframes, etc.) used. For example, the configurations 148 may include standard subframe configurations 0-6 as illustrated in Table (1) above in accordance with 3GPP Releases 8-10. In some implementations, configurations A 148a may additionally include other configurations. Configurations A 148a included in the eNB 160 may correspond to configurations B 148b included in the UE 102. More detail on (UL-DL) configurations 148a-b is given below in connection with FIG. 10.

The signalling module 194 may generate signalling used to control which of the configurations A 148a is used for communication between the eNB 160 and the UE 102. For example, the signalling module 194 may generate physical (PHY) layer signalling in order to dynamically change the direction (e.g., UL or DL) of convertible subframes. In this case, the signalling module 194 may generate a signal directing the UE 102 to convert a DL subframe to an UL subframe or directing the UE 102 to convert an UL subframe to a DL subframe.

The signalling module 194 may generate signalling that indicates a default UL-DL configuration for the UE 102 (and legacy UEs, for example). In some implementations, the signalling module 194 may generate explicit signalling (that is sent to the UE 102) that indicates a first reference UL-DL configuration (e.g., reference UL-DL configuration A 139a) and a second reference UL-DL configuration (e.g., reference UL-DL configuration B 139b). Additionally or alternatively, the signalling module 194 may generate explicit signalling (that is sent to the UE 102) that indicates a dynamic UL-DL reconfiguration range 196. It should be noted that the eNB 160 (e.g., eNB UL-DL reconfiguration module 128) may determine, dictate, track and/or store a first reference UL-DL configuration and a second reference UL-DL configuration for one or more of the UEs 102. Additionally or alternatively, the eNB 160 (e.g., eNB UL-DL reconfiguration module 128) may determine, dictate, track and/or store a dynamic UL-DL reconfiguration range for one or more of the UEs 102.

The traffic monitoring module 126 may monitor the amount of UL and DL traffic (e.g., communications) occurring between the eNB 160 and the one or more UEs 102. For example, the traffic monitoring module 126 may determine whether current UL and/or DL allocations are sufficient for current traffic loads. In other words, the traffic monitoring module 126 may determine whether the current UL-DL configuration (one of UL-DL configurations A 148a, for example) should be changed to better suit current UL and/or DL traffic.

In some cases, the eNB 160 may transition operation between configurations A 148a. For example, the eNB UL-DL reconfiguration module 128 may direct one or more UEs 102 to use one of UL-DL configurations A 148a that is different from the current UL-DL configuration. In some implementations, transitioning between states may be based on current UL and/or DL traffic, one or more counters and/or one or more timers.

For example, the traffic monitoring module 126 may indicate that the current UL-DL configuration (from configurations A 148a) cannot accommodate current or anticipated UL and/or DL traffic. Based on this indication, the eNB 160 transition to an UL-DL configuration (from configurations A 148a) that better accommodates the traffic load. For instance, if the current UL-DL configuration 148 is insufficient to accommodate current UL traffic, the eNB 160 and UE 102 may transition to an UL-DL configuration that is sufficient to accommodate the current UL traffic. This may be done by converting DL subframes to special subframe type 2 subframes using PHY layer signalling, for example. In this case, the signalling module 194 may generate physical (PHY) layer signalling that is used to inform the one or more UEs 102 to convert a DL subframe to an UL subframe.

The special subframe type 2 structure 130 may specify the structure of the special subframe type 2 in certain circumstances. For instance, the structure of the special subframe type 2 may vary depending on whether an association corresponds to a target DL subframe (e.g., the DL subframe to be converted), depending on whether an UL or DL subframe precedes the target DL subframe and/or depending on a length of a PDCCH that may (or may not) be included in the special subframe type 2.

The eNB UL-DL reconfiguration module 128 may provide information to the scheduling module 164. For example, the eNB UL-DL reconfiguration module 128 may indicate one of the configurations A 148a that specifies the direction of a number of subframes. Additionally, the eNB UL-DL reconfiguration module 128 may indicate a change in subframe direction. This may allow the scheduling module 164 to schedule the one or more UEs 102 accordingly.

Additionally or alternatively, one or more legacy restrictions 134 may be provided to the scheduling module 164. This may allow the eNB 160 to restrict the legacy UEs in some subframes to maintain backward compatible timing. For instance, the eNB 160 may restrict the PDSCH transmission for legacy UEs in the DL subframes that are linked to (e.g., associated with) a given convertible subframe. The eNB 160 may also apply legacy restrictions 134 to prevent PDSCH allocations that are linked to (e.g., associated with) an UL subframe that is converted to a DL subframe. Furthermore, the eNB 160 may avoid scheduling a PDSCH in a convertible subframe that is converted from a DL subframe to an UL subframe.

The eNB operations module 182 may provide information 190 to the one or more receivers 178. For example, the eNB operations module 182 may inform the receiver(s) 178 when or when not to receive transmissions based on a current UL-DL configuration 148a.

The eNB operations module 182 may provide information 188 to the demodulator 172. For example, the eNB operations module 182 may inform the demodulator 172 of a modulation pattern anticipated for transmissions from the UE(s) 102. In some implementations, this may be based on a current UL-DL configuration 148a.

The eNB operations module 182 may provide information 186 to the decoder 166. For example, the eNB operations module 182 may inform the decoder 166 of an anticipated encoding for transmissions from the UE(s) 102. In some implementations, this may be based on a current UL-DL configuration 148a.

The eNB operations module 182 may provide information 101 to the encoder 109. The information 101 may include data to be encoded and/or instructions for encoding. For example, the eNB operations module 182 may instruct the encoder 109 to encode transmission data 105 and/or control information 101 based on a current UL-DL configuration 148a (e.g., whether a DL subframe is converted to a special subframe type 2). Additionally or alternatively, the information 101 may include data to be encoded, such as PHY layer signalling (e.g., a PDCCH, a PHICH, etc.) and/or RRC signalling indicating scheduling information, HARQ-ACK information, channel allocations and/or other control information.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. In some implementations, this may be based on a current UL-DL configuration 148a. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. In some implementations, this may be based on a current UL-DL configuration 148a. For instance, the one or more transmitters 117 may not transmit during portions or all of a DL subframe that has been converted to a special subframe type 2. The one or more transmitters 117 may upconvert and transmit the modulated signal(s) 115 to one or more UEs 102.

It should be noted that a DL subframe may be transmitted from the eNB 160 to one or more UEs 102 and that an UL subframe may be transmitted from one or more UEs 102 to the eNB 160. Furthermore, both the eNB 160 and the one or more UEs 102 may transmit data in a standard special subframe. In a special subframe type 2, one or more UEs 102 may transmit data. However, in a special subframe type 2, the eNB 160 may or may not transmit data.

Figure 2:
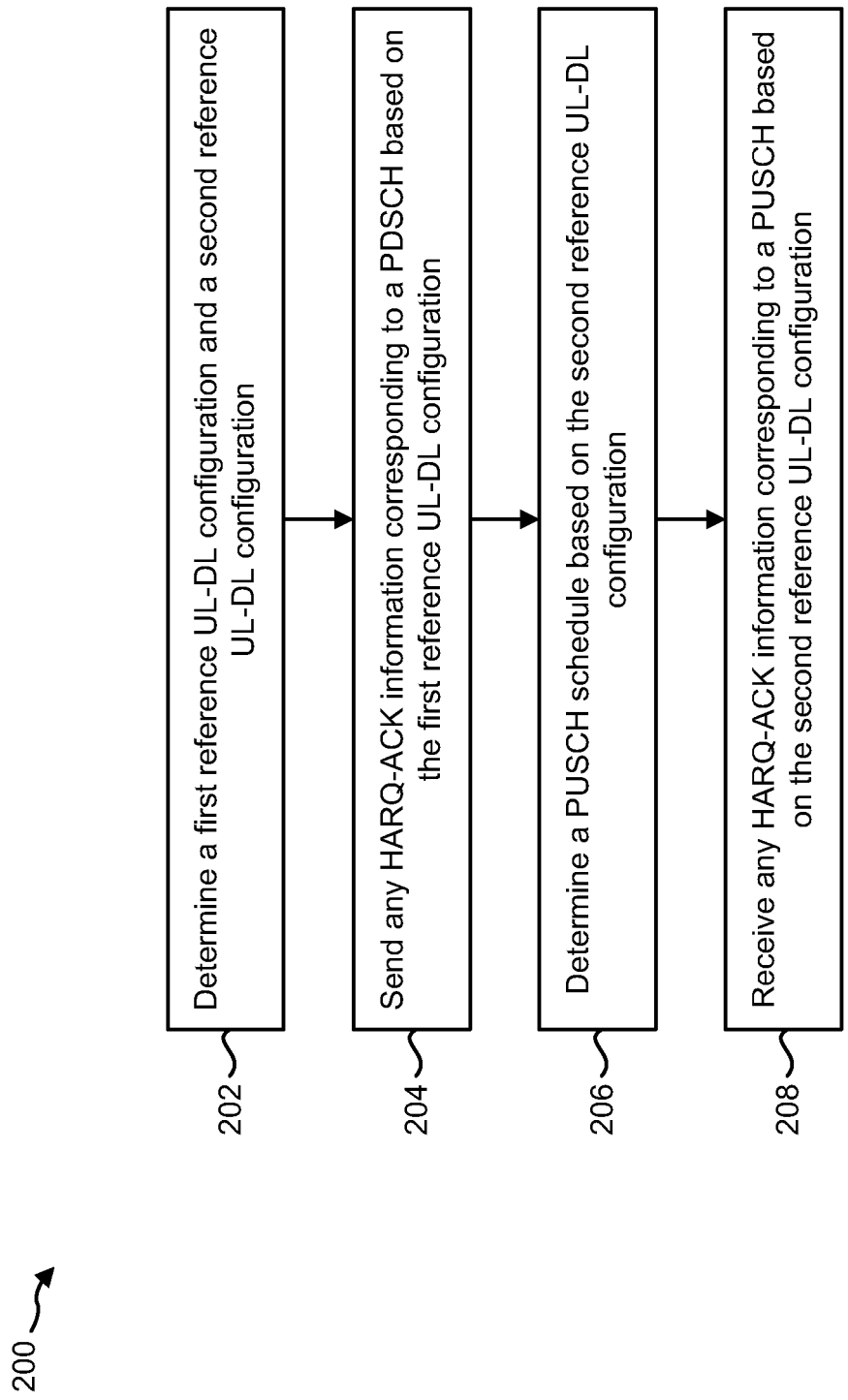
FIG. 2 is a flow diagram illustrating one configuration of a method for reconfiguring uplink-downlink allocations on a UE.

FIG. 2 is a flow diagram illustrating one configuration of a method 200 for reconfiguring uplink-downlink allocations on a UE 102. In some implementations, the UE 102 may determine whether at least one subframe is convertible over a default TDD UL-DL configuration (whether dynamic UL-DL reconfiguration is supported, for example). The dynamic UL-DL reconfiguration support may be determined implicitly or explicitly. For example, the UE 102 may receive a system information block (SIB) or higher layer signaling (e.g., RRC signaling) from the eNB 160 that explicitly specifies whether to configure or to enable or disable dynamic UL-DL reconfiguration. In another example, the UE 102 may receive signaling related to a dynamic UL-DL reconfiguration (e.g., a dynamic UL-DL reconfiguration range, convertible subframe, reference UL-DL configuration(s), convertible region(s) and/or the number of convertible subframes, etc.) that may implicitly specify the support of dynamic UL-DL reconfiguration. The dynamic UL-DL reconfiguration support may be signaled as cell-specific, to a group of UEs or as UE-specific. If the UE 102 receives implicit or explicit signaling indicating dynamic UL-DL reconfiguration support, then the UE may determine that at least one subframe is convertible over a default TDD UL-DL configuration.

If at least one subframe is convertible over the default TDD UL-DL configuration, the UE 102 may perform one or more of the method 200 steps illustrated in FIG. 2. In some implementations, this determination may be based on UE 102 capability. For example, if the UE 102 is a Release-11 or beyond UE 102, then it may determine that at least one subframe is convertible over the default TDD UL-DL configuration. Additionally or alternatively, the UE 102 may base this determination upon receiving signaling for a first reference UL-DL configuration and/or a second reference UL-DL configuration that may be determined 202 as described below. For example, if the UE 102 receives signaling that can be used to determine 202 the first reference UL-DL configuration and/or the second reference UL-DL configuration, the UE 102 may determine that at least one subframe is convertible over the default TDD UL-DL configuration. The UE 102 may then perform method 200 steps (e.g., 202, 204, 206, 208) as described below.

The UE 102 may determine 202 a first reference UL-DL configuration 139a and a second reference UL-DL configuration 139b. In some implementations, the UE 102 may make this determination 202 by receiving explicit RRC signalling from the eNB 160 that specifies the first reference UL-DL configuration 139a and the second reference UL-DL configuration 139b.

In other implementations, the UE 102 may make this determination 202 based on other (e.g., implicit) information. For example, the UE 102 may determine 202 the reference UL-DL configurations 139a-b based on a dynamic UL-DL reconfiguration range 196, which may be signaled by the eNB 160. For instance, the dynamic UL-DL reconfiguration range 196 may specify a range of UL-DL configurations B 148b that are allowed. The first reference UL-DL configuration 139a may be the UL-DL configuration in the dynamic UL-DL reconfiguration range 196 with a minimum number of UL subframes. The second reference UL-DL configuration 139b may be the UL-DL configuration in the dynamic UL-DL reconfiguration range 196 with a maximum number of UL subframes (or minimum number of DL subframes, for example).

It should be noted that the first reference UL-DL configuration 139a may or may not be the same as a default UL-DL configuration. Additionally or alternatively, the second reference UL-DL configuration 139b may or may not be the same as the default UL-DL configuration.

The UE 102 may send 204 any HARQ-ACK information corresponding to a PDSCH (e.g., PDSCH HARQ-ACK) based on the first reference UL-DL configuration 139a. For example, the UE 102 may generate HARQ-ACK information corresponding to a PDSCH. The UE 102 may then send 204 the HARQ-ACK information corresponding to the PDSCH based on the association(s) and subframe structure of the first reference UL-DL configuration 139a. For instance, the first reference UL-DL configuration 139a may specify an association between a DL subframe and an UL subframe, where HARQ-ACK information corresponding to a PDSCH in the DL subframe must be sent in the UL subframe. The UE 102 may accordingly send 204 the HARQ-ACK information corresponding to the PDSCH in the UL subframe as specified by the first reference UL-DL configuration 139a.

The UE 102 may determine 206 a PUSCH schedule (e.g., schedule 106) based on the second reference UL-DL configuration 139b. For example, the second reference UL-DL configuration 139b may specify subframes in which a PUSCH may be scheduled. For instance, the second reference UL-DL configuration 139b may specify an association between a DL subframe (or a special subframe) and an UL subframe, where a scheduling message received in the DL subframe schedules a PUSCH in the UL subframe. Accordingly, the UE 102 may determine 206 the PUSCH schedule based on the second reference UL-DL configuration 139b.

The UE 102 may receive 208 any HARQ-ACK information corresponding to a PUSCH (e.g., PUSCH HARQ-ACK) based on the second reference UL-DL configuration 139b. For example, the UE 102 may receive 208 HARQ-ACK information corresponding to a PUSCH (that was sent from the UE 102) based on the association(s) and subframe structure of the second reference UL-DL configuration 139b. For instance, the second reference UL-DL configuration 139b may specify an association between an UL subframe and a DL subframe (or a special subframe), where HARQ-ACK information corresponding to a PUSCH in the UL subframe must be sent in the DL subframe (or special subframe). The UE 102 may accordingly receive 208 the HARQ-ACK information corresponding to the PUSCH in the DL subframe (or special subframe) as specified by the second reference UL-DL configuration 139b.

In some implementations, the UE 102 may determine a dynamic UL-DL reconfiguration range 196. For example, the UE 102 may receive signalling from the eNB 160 that explicitly specifies the dynamic UL-DL reconfiguration range 196. In another example, the UE 102 may derive the dynamic UL-DL reconfiguration range 196 based on reference UL-DL configurations 139a-b signalled by the eNB 160.

In some implementations, the UE 102 may determine one or more convertible subframes. For example, the UE 102 may receive signalling from the eNB 160 that explicitly specifies the one or more convertible subframes. In another example, the UE 102 may derive the one or more convertible subframes based on the dynamic UL-DL reconfiguration range 196. For instance, the UE 102 may determine which subframes differ between UL-DL configurations B 148b included in the dynamic UL-DL reconfiguration range 196 and designate those that differ as convertible subframes.

Figure 3:
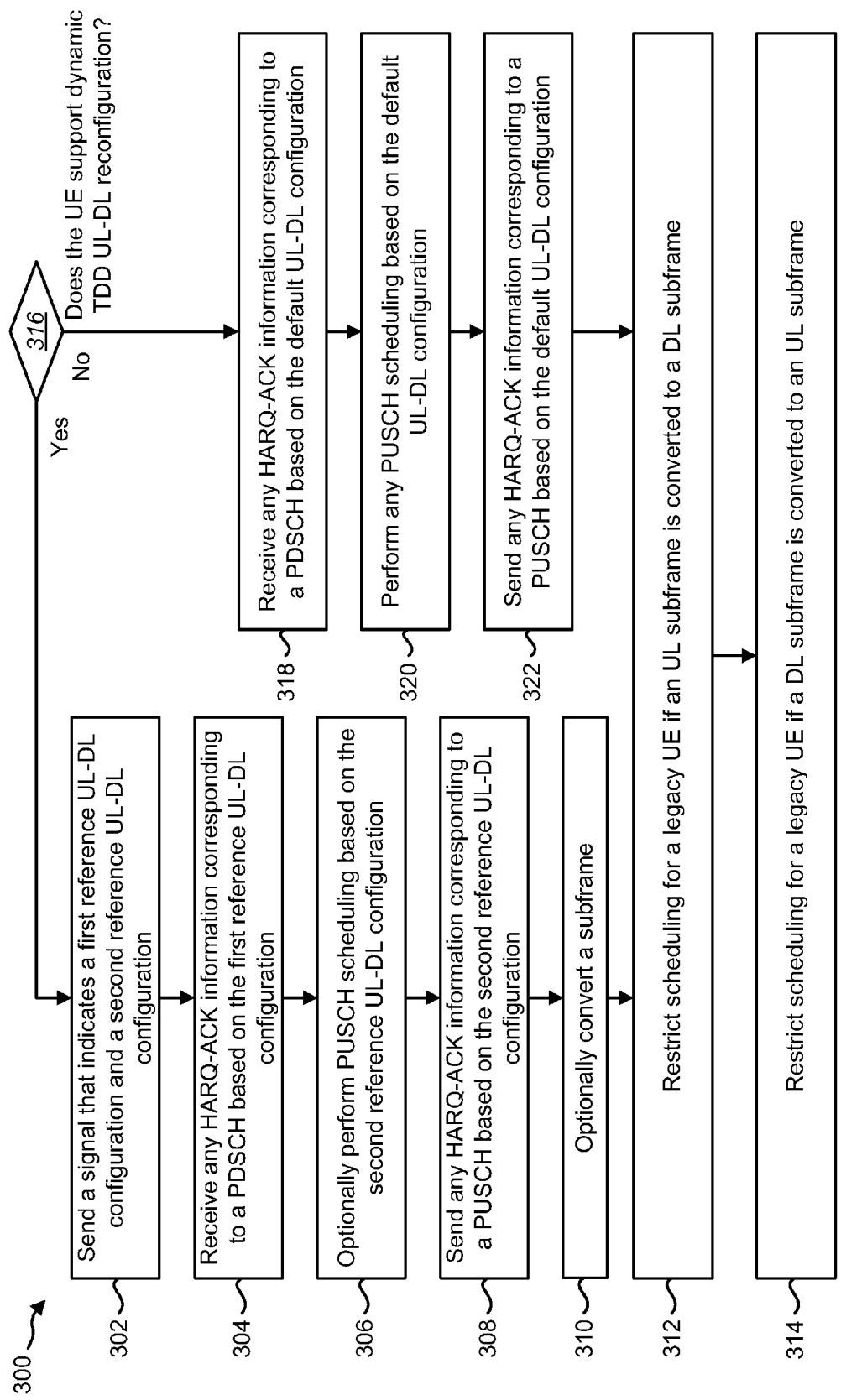
FIG. 3 is a flow diagram illustrating one configuration of a method for reconfiguring uplink-downlink allocations on an eNB.

FIG. 3 is a flow diagram illustrating one configuration of a method 300 for reconfiguring uplink-downlink allocations on an eNB 160. One or more steps of this method 300 may be applied to Release-11 and beyond UEs, a subset of Release-11 and beyond UEs or a specific Release-11 and beyond UE that is or are configured to support dynamic UL-DL reconfiguration. The eNB 160 may optionally determine 316 whether a UE supports dynamic TDD UL-DL reconfiguration (whether at least one subframe is convertible over a default TDD UL-DL configuration, for example). In some implementations, this determination 316 is made without any input from a UE 102. For example, the eNB 160 may be implemented to support dynamic TDD UL-DL reconfiguration. The eNB 160 may accordingly determine 316 that at least one subframe is convertible over a default TDD UL-DL configuration. In such a case, the eNB 160 may send signaling to configure (e.g., direct) one or more UEs 102 to support dynamic UL-DL reconfiguration (and perform one or more method 300 steps, e.g., 302, 304, 306, 308, 310, 312, 314). In other implementations, the eNB 160 may receive a signal from one or more UEs 102 that indicate that they are capable of dynamic UL-DL reconfiguration.

If the eNB 160 determines 316 that the UE 102 supports dynamic UL-DL reconfiguration, the eNB 160 may send one or more signals. In particular, the eNB 160 may indicate dynamic UL-DL reconfiguration support implicitly or explicitly to one or more UEs 102. For example, the eNB 160 may send a system information block (SIB) or higher layer signaling (e.g., RRC signaling) that may be used to configure or to enable or disable dynamic UL-DL reconfiguration. Additionally or alternatively, signaling related to a dynamic UL-DL reconfiguration (e.g., a dynamic UL-DL reconfiguration range, convertible subframe, reference UL-DL configuration(s), convertible region(s), and/or the number of convertible subframes) may implicitly indicate the support of dynamic UL-DL reconfiguration to one or more UEs 102. The dynamic UL-DL reconfiguration support may be configured as cell-specific, to a group of UEs or as UE-specific.

If at least one subframe is convertible over the default TDD UL-DL configuration, the eNB 160 may perform one or more of the method 300 steps illustrated in FIG. 3. In some implementations, this determination 316 may be based on UE 102 capability. For example, if the eNB 160 is communicating with a Release-11 or beyond UE 102, then it may determine that at least one subframe is convertible over the default TDD UL-DL configuration. Additionally or alternatively, the eNB 160 may base this determination upon a first reference UL-DL configuration and/or a second reference UL-DL configuration. For example, if the first reference UL-DL configuration and/or the second reference UL-DL configuration indicate that at least one subframe is convertible over the default TDD UL-DL configuration, then the eNB 160 may perform additional steps (e.g., steps 302, 304, 306, 308, 310, 312, 314) as described below.

The eNB 160 may send 302 a signal that indicates a first reference UL-DL configuration 139*a* and a second reference UL-DL configuration 139*b* (if the eNB 160 determines 316 that a corresponding UE supports dynamic UL-DL reconfiguration, for example). The signal may indicate the reference UL-DL configurations 139*a-b* explicitly or implicitly. For example, the signal may explicitly indicate which UL-DL configuration is a first reference UL-DL configuration 139*a* and which UL-DL configuration is a second reference UL-DL configuration 139*b*. Alternatively, the signal may implicitly indicate the reference UL-DL configurations 139*a-b*. For example, the signal may indicate a dynamic UL-DL reconfiguration range 196, which the UE 102 may use to derive the first and second reference UL-DL configurations 139*a-b*. In yet other examples, the signal may implicitly indicate the reference UL-DL configurations 139*a-b* by specifying the number of convertible subframes in each direction (e.g., UL and DL) or by specifying one or more convertible regions 107. The UE 102 may use this information to derive the first and second reference UL-DL configurations 139*a-b*.

The eNB 160 may receive 304 any HARQ-ACK information corresponding to a PDSCH (e.g., PDSCH HARQ-ACK) based on the first reference UL-DL configuration. For example, the UE 102 may generate and send HARQ-ACK information corresponding to a PDSCH. The eNB 160 may then receive 304 the HARQ-ACK information corresponding to the PDSCH based on the association(s) and subframe structure of the first reference UL-DL configuration. For instance, the first reference UL-DL configuration may specify an association between a DL subframe and an UL subframe, where HARQ-ACK information corresponding to a PDSCH in the DL subframe must be sent in the UL subframe. The eNB 160 may accordingly receive 304 the HARQ-ACK information corresponding to the PDSCH in the UL subframe as specified by the first reference UL-DL configuration.

The eNB 160 may optionally schedule 306 a PUSCH based on the second reference UL-DL configuration 139*b*. For example, the second reference UL-DL configuration may specify subframes in which a PUSCH may be scheduled. For instance, the second reference UL-DL configuration may specify an association between a DL subframe (or a special subframe) and an UL subframe, where a scheduling message sent in the DL subframe schedules a PUSCH in the UL subframe. Accordingly, the eNB 160 may optionally schedule 306 a PUSCH by sending a scheduling message (e.g., PDCCH) in the DL subframe based on the second reference UL-DL configuration.

The eNB 160 may send 308 any HARQ-ACK information corresponding to a PUSCH (e.g., PUSCH HARQ-ACK) based on the second reference UL-DL configuration. For example, the eNB 160 may send 308 HARQ-ACK information corresponding to a PUSCH (that was sent from the UE 102) based on the association(s) and subframe structure of the second reference UL-DL configuration. For instance, the second reference UL-DL configuration may specify an association between an UL subframe and a DL subframe (or a special subframe), where HARQ-ACK information corresponding to a PUSCH in the UL subframe must be sent in the DL subframe (or special subframe). The eNB 160 may accordingly send 308 the HARQ-ACK information corresponding to the PUSCH in the DL subframe (or special subframe) as specified by the second reference UL-DL configuration.

The eNB 160 may optionally convert 310 a subframe. For example, the eNB 160 may generate PHY layer signalling to dynamically change the direction of a (convertible) subframe. For instance, the eNB 160 may generate (and send) a PHY layer signal that schedules a PUSCH in a subframe that is a DL subframe in a default UL-DL configuration. Additionally or alternatively, the eNB 160 may generate (and send) a PHY layer signal that schedules a PDSCH in a subframe that is an UL subframe in the default UL-DL configuration.

In some implementations, the eNB 160 may convert 310 a subframe when the default UL-DL configuration is insufficient for the current traffic load. For example, if the eNB 160 has more downlink traffic than is supported by the default UL-DL configuration (that is greater than a threshold, for example), the eNB 160 may convert 310 one or more UL subframes to one or more DL subframes. Conversely, if one or more UEs 102 have more uplink traffic than is supported by the default UL-DL configuration (that is greater than a threshold, for example), the eNB 160 may convert 310 one or more DL subframes to one or more UL subframes.

The eNB 160 may restrict 312 scheduling for any legacy UE if an UL subframe is converted to a DL subframe. For any legacy UE being served by the eNB 160, for example, the eNB 160 may apply scheduling restrictions. For instance, the eNB 160 may restrict 312 scheduling a PUSCH (e.g., PUSCH information) in an UL subframe (of the default UL-DL configuration) that has been converted to a DL subframe (for any legacy UE). Additionally, the eNB 160 may restrict 312 scheduling a PDSCH (e.g., PDSCH information) in a subframe that has an association with an UL subframe that has been converted to a DL subframe in order to avoid scheduling (UL) HARQ-ACK feedback corresponding to the PDSCH in the converted subframe (for any legacy UE). More specific examples of restricting 312 scheduling are given above.

The eNB 160 may restrict 314 scheduling for any legacy UE if a DL subframe is converted to an UL subframe. For any legacy UE being served by the eNB 160, for example, the eNB 160 may apply scheduling restrictions. For instance, the eNB 160 may restrict 314 scheduling a PDSCH (e.g., PDSCH information) in a DL subframe (of the default UL-DL configuration) that has been converted to an UL subframe (for any legacy UE). More specific examples of restricting 314 scheduling are given above.

In particular, for legacy UEs (e.g., in the case that the eNB 160 determines 316 that a UE does not support dynamic TDD UL-DL reconfiguration), the default UL-DL configuration is used for PDSCH HARQ-ACK timing, PUSCH scheduling and PUSCH HARQ-ACK reporting. The first reference UL-DL configuration and the second reference UL-DL configuration are not applied to legacy UEs. Therefore, for legacy UEs, the eNB 160 may receive 318 any HARQ-ACK information corresponding to a PDSCH based on the default reference UL-DL configuration. The eNB 160 may perform 320 any PUSCH scheduling for legacy UEs based on the default reference UL-DL configuration. The eNB 160 may send 322 any HARQ-ACK information corresponding to a PUSCH from a legacy UE based on the default UL-DL configuration. The eNB 160 may additionally restrict 312, 314 scheduling for the legacy UE as described above.

Figure 4:
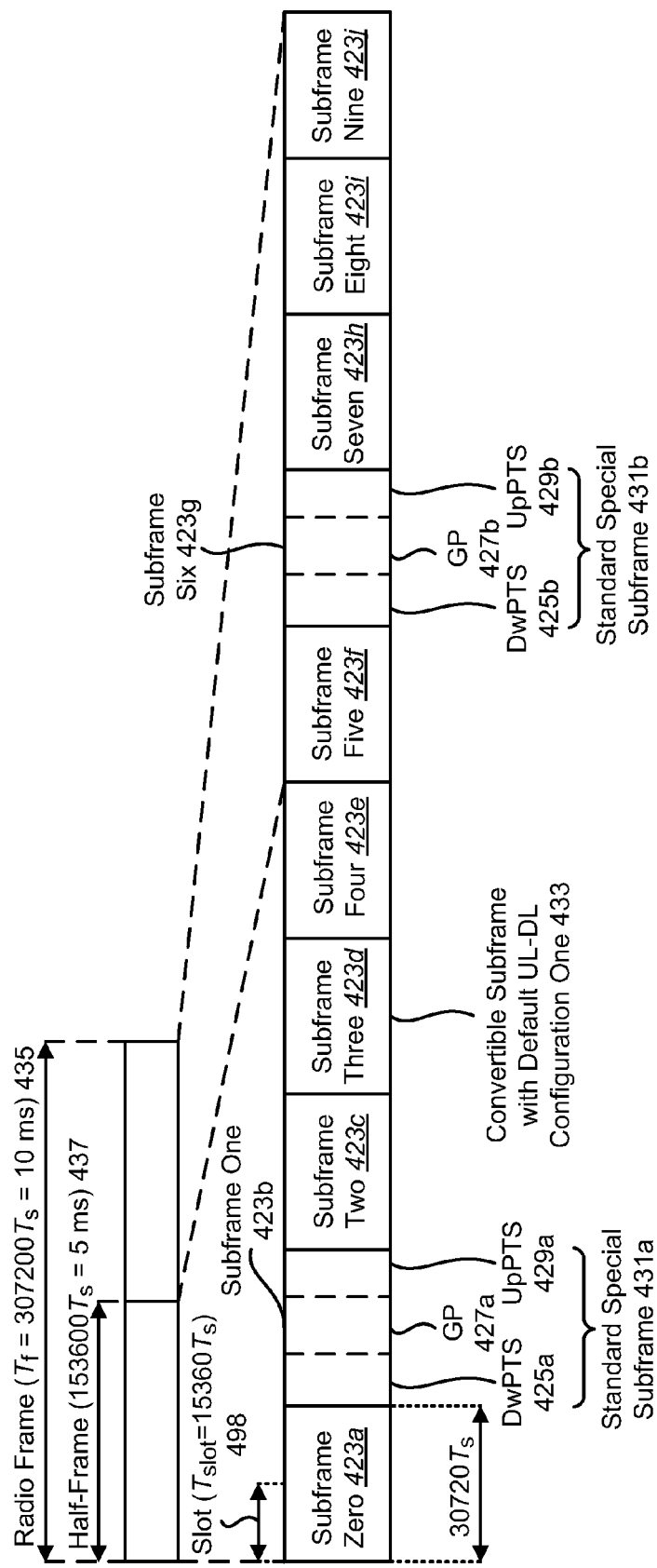
FIG. 4 is a diagram illustrating one example of a radio frame that may be used in accordance with the systems and methods disclosed herein.

FIG. 4 is a diagram illustrating one example of a radio frame 435 that may be used in accordance with the systems and methods disclosed herein. This radio frame 435 structure may be applicable in time-division duplexing (TDD) approaches. Each radio frame 435 may have a length of $T_f=307200 \cdot T_s=10$ milliseconds (ms), where $T_f$ is a radio frame 435 duration and $T_s$ is a time unit equal to $$\frac{1}{(15000 \times 2048)}$$

seconds. The radio frame 435 may include two half-frames 437, each having a length of $153600 \cdot T_s=5$ ms. Each half-frame 437 may include five subframes 423a-e, 423f-j, each having a length of $30720 \cdot T_s=1$ ms.

In accordance with the systems and methods disclosed herein, some types of subframes 423 that may be used include a DL subframe, an UL subframe, a standard special subframe 431 and a special subframe type 2. In the example illustrated in FIG. 4, two standard special subframes 431a-b are included the radio frame 435.

The first standard special subframe 431a includes a downlink pilot time slot (DwPTS) 425a, a guard period (GP) 427a and an UL pilot time slot (UpPTS) 429a. In this example, the first standard special subframe 431a is included in subframe one 423b. The second standard special subframe 431b includes a downlink pilot time slot (DwPTS) 425b, a guard period (GP) 427b and an UL pilot time slot (UpPTS) 429b. In this example, the second standard special subframe 431b is included in subframe six 423g. The length of the DwPTS 425a-b and UpPTS 429a-b may be given by Table 4.2-1 of 3GPP TS 36.211 (illustrated in Table (2) above) subject to the total length of each set of DwPTS 425, GP 427 and UpPTS 429 being equal to $30720 \cdot T_s=1$ ms.

Each subframe i 423a-j (where i denotes a subframe ranging from subframe zero 423a (e.g., 0) to subframe nine 423j (e.g., 9) in this example) is defined as two slots, $2i$ and $2i+1$ of length $T_{slot}=15360 \cdot T_s=0.5$ ms in each subframe 423. For example, subframe zero (e.g., 0) 423a may include two slots, including a first slot 498.

UL-DL configurations with both 5 ms and 10 ms DL-to-UL switch-point periodicity may be used in accordance with the systems and methods disclosed herein. FIG. 4 illustrates one example of a radio frame 435 with 5 ms switch-point periodicity. In the case of 5 ms DL-to-UL switch-point periodicity, each half-frame 437 includes a standard special subframe 431a-b. In the case of 10 ms DL-to-UL switch-point periodicity, a standard special subframe may exist in the first half-frame 437 only.

Subframe zero (e.g., 0) 423a and subframe five (e.g., 5) 423f and DwPTS 425a-b may be reserved for DL transmission. The UpPTS 429a-b and the subframe(s) immediately following the standard special subframe(s) 431a-b (e.g., subframe two 423c and subframe seven 423h) may be reserved for UL transmission. In one implementation, in a case where multiple cells are aggregated, a UE 102 may assume the same UL-DL configuration across all the cells and that the guard period (GP) of the special subframe(s) in the different cells have an overlap of at least $1456 \cdot T_s$.

One or more of the subframes 423 illustrated in FIG. 4 may be convertible, depending on the dynamic UL-DL reconfiguration range. Assuming a default UL-DL configuration 1 as given in Table (1) above, for example, subframe three (e.g., 3) 423d may be a convertible subframe 433 (from UL-to-DL, for instance).

Figure 5:
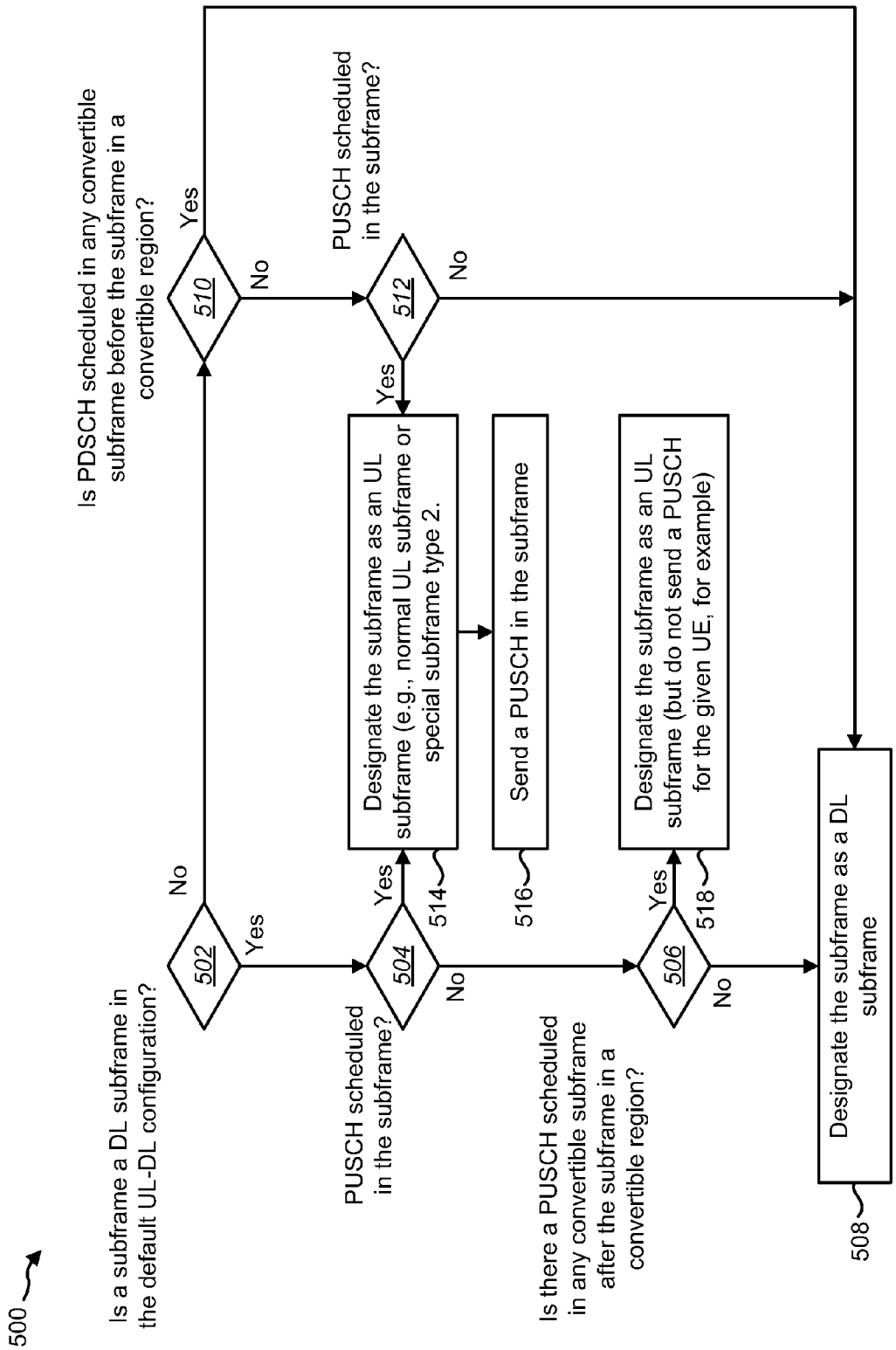
FIG. 5 is a flow diagram illustrating one configuration of a method for determining a subframe direction.

FIG. 5 is a flow diagram illustrating one configuration of a method 500 for determining a subframe direction. In some implementations, the method 500 may be performed for each convertible subframe in one or more convertible regions. It should be noted that for a convertible subframe (that allows UL and DL switching), explicit or implicit rules may be defined to determine the subframe direction (e.g., UL or DL). The method 500 illustrated in FIG. 5 is one example of an approach for a UE 102 to determine the direction of a convertible subframe (e.g., change the direction of a convertible subframe given in a default UL-DL configuration in some cases). In this example, a UE 102 (e.g., Release 11 UE) that is configured with dynamic UL and DL reconfiguration may first assume a direction of a convertible subframe as the direction specified by a default UL-DL configuration. In some configurations, the method 500 illustrated in FIG. 5 may be performed for each convertible subframe (e.g., for each subframe in one or more convertible regions).

The UE 102 may determine 502 whether a subframe is a DL subframe in the default UL-DL configuration. For example, if the subframe is specified as a DL subframe in the default UL-DL configuration, then the UE 102 may determine 502 that the subframe is a DL subframe in the default UL-DL configuration.

If the UE 102 determines 502 that the subframe is a DL subframe in the default UL-DL configuration, then the UE 102 may determine 504 whether a PUSCH is scheduled in the subframe (e.g., whether the subframe has a scheduled PUSCH). In one example, this determination 504 may be based on a PDCCH received by the UE 102 that schedules a PUSCH in the subframe.

If the UE 102 determines 504 that a PUSCH is scheduled in the subframe (e.g., that the subframe has a scheduled PUSCH), the UE 102 may designate 514 the subframe as an UL subframe (e.g., a normal uplink subframe or a special subframe type 2). For example, the UE 102 may convert the subframe (that is a DL subframe in the default UL-DL configuration) to an UL subframe. For DL-to-UL conversion, for example, if the UE 102 receives a PDCCH to schedule a PUSCH for a convertible subframe with a default DL direction, then the UE 102 may determine that the DL subframe may be converted to an UL subframe or to a special subframe type 2 in some cases. If the (convertible) subframe is immediately after a DL subframe (which may happen with a mixed 5 ms and 10 ms UL-DL configuration range), the (convertible) subframe may be converted into a special subframe type 2. If the (convertible) subframe is associated with PUSCH scheduling and/or PUSCH HARQ-ACK reporting with the default UL-DL configuration, the convertible subframe may be converted into a special subframe type 2. The UE 102 may send 516 a PUSCH in the subframe. For example, the UE 102 sends information as a PUSCH in the subframe.

If the UE 102 determines 504 that a PUSCH is not scheduled in the subframe (e.g., that the subframe does not have a scheduled PUSCH), then the UE 102 may determine 506 whether a PUSCH is scheduled in any convertible subframe (e.g., whether any convertible subframe has a scheduled PUSCH) after the subframe in a convertible region (that includes the subframe). If the UE 102 determines 506 that a PUSCH is scheduled in a convertible subframe (e.g., that a convertible subframe has a scheduled PUSCH) after the subframe in the convertible region, then the UE 102 may designate 518 the subframe as an UL subframe. For example, the UE 102 may convert the subframe (that is a DL subframe in the default UL-DL configuration) to an UL subframe. However, the UE 102 may not send a PUSCH in the subframe in this case, however.

Thus, all convertible subframes in a convertible region that are before a subframe that has been converted from a DL subframe to an UL subframe may be designated as (e.g., converted to) UL subframes. In other words, if a subframe is converted from a DL subframe to an UL subframe for a UE 102, and the subframe is not the first convertible subframe in a convertible region after a special subframe or DL subframe, all convertible subframes in the given convertible region and before the given convertible subframe may also be treated as UL subframes by the UE 102. For example, suppose the convertible region has two downlink subframes or "DL DL." If the last DL subframe is converted to an UL and a PUSCH is scheduled for a UE, the DL before should be treated as an UL even if the UE does not receive a PUSCH allocation in the given subframe (e.g., the UE may assume two uplink subframes or "UL UL," not "DL UL").

If the UE 102 determines 502 that the subframe is not a DL subframe in the default UL-DL configuration (e.g., the subframe is an UL subframe in the default UL-DL configuration), then the UE 102 may determine 510 whether a PDSCH is scheduled in any convertible subframe (e.g., whether any convertible subframe has a scheduled PDSCH) before the subframe in a convertible region (that includes the subframe). If the UE 102 determines 510 that a PDSCH is scheduled in a convertible subframe (e.g., that a convertible subframe has a scheduled PDSCH) before the subframe in the convertible region, then the UE 102 may designate 508 the subframe as a DL subframe. For example, the UE 102 may convert the subframe (that is an UL subframe in the default UL-DL configuration) to a DL subframe. In other words, if a subframe in a convertible region is converted from an UL subframe to a DL subframe for a UE, and the following subframe is not the last convertible subframe in a convertible region after a special subframe or DL subframe, all convertible subframes in the given convertible region and after the given convertible subframe may also be treated as DL subframes by the UE 102. For example, suppose the convertible region has two uplink subframes or "UL UL." If the first UL subframe is converted to a DL subframe, the UL subframe after should be treated as an DL as well (e.g., the UE may assume two downlink subframes or "DL DL," not "DL UL").

If the UE 102 determines 510 that a PDSCH is not scheduled in any convertible subframe (e.g., that any convertible subframe does not have a scheduled PDSCH) before the subframe in a convertible region (that includes the subframe), then the UE 102 may determine 512 whether a PUSCH is scheduled in the subframe (e.g., whether the subframe has a scheduled PUSCH). In some configurations, this determination 512 may be based on whether the UE 102 receives a PDCCH to schedule a PUSCH in the subframe. For UL-to-DL subframe conversion, for example, if the UE does not receive a PDCCH to schedule a PUSCH for a convertible subframe with a default UL direction, the UE 102 may monitor (e.g., designate 508, convert) the convertible subframe as a DL subframe. Additionally or alternatively, a PDSCH in a convertible subframe with a default UL direction may also be scheduled explicitly by cross-subframe (or cross-transmission time interval (TTI)) PDSCH allocation with a PDCCH or enhanced PDCCH (ePDCCH) in another DL subframe. The same DL subframe used for the PUSCH scheduling may be used to schedule a PDSCH transmission in the convertible subframe instead. Other DL subframes before the given convertible subframe may also be used for cross-subframe scheduling of PDSCH transmission on the (convertible) subframe.

If the UE 102 determines 512 that a PUSCH is scheduled in the subframe (e.g., that the subframe has a scheduled PUSCH), then the UE 102 may designate 514 the subframe as a normal UL subframe. It should be noted, for instance, that this subframe is an UL subframe in the default UL-DL configuration and there may be no need to change it to a special subframe type 2. The UE 102 may send 516 a PUSCH in the subframe. For example, the UE 102 send information as a PUSCH in the subframe. For UEs (e.g., Release 11 UEs), the PUSCH scheduling may follow the scheduling timing of the second reference UL-DL configuration by a legacy PDCCH. The PUSCH scheduling may also be performed by enhanced PDCCH (ePDCCH) or cross-subframe (or cross-TTI) PUSCH scheduling, if supported.

Figure 6:
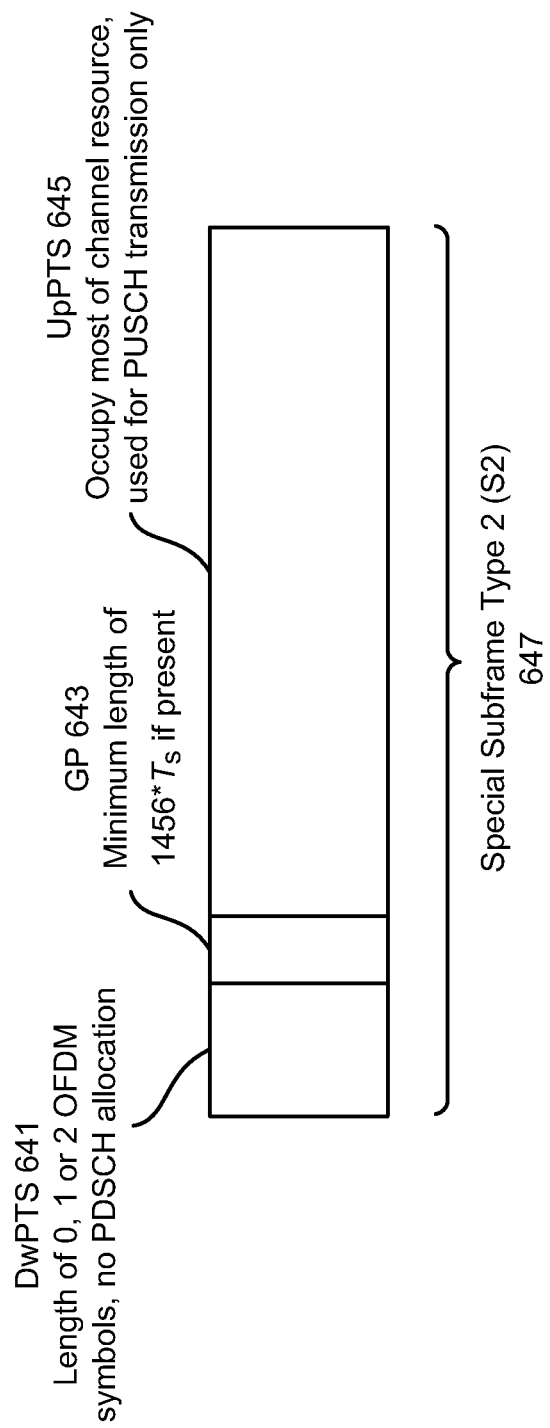
FIG. 6 is a diagram illustrating one example of the structure of a special subframe type 2 (S2)

FIG. 6 is a diagram illustrating one example of the structure of a special subframe type 2 (S2) 647. A standard special subframe (not to be confused with the special subframe type 2 (S2) 647) may be used for DL-to-UL switching. In the standard special subframe, a short time may be allocated for UL transmission (e.g., one or two symbols), while most of the channel resource may be allocated for DL transmission. However, the special subframe type 2 (S2) 647 may provide more resources for UL transmission while maintaining all necessary DL signalling (e.g., control information for PUSCH scheduling and PHICH feedback). A DL subframe may be converted to a special subframe type 2 (S2) 647 by maintaining only the PDCCH transmission (if any) and allocating the rest of the resources to PUSCH transmission (with a possible guard period 643, for example).

In PUSCH scheduling with a PDCCH DCI format 0, a PUSCH allocation is a block of continuous resource blocks (RBs) represented by the index of the start RB and the number of RBs. The usable resource elements (REs) for each subcarrier in a PUSCH allocation for a special subframe type 2 (S2) 647 may be the same as a number of symbols in an UL pilot time slot (UpPTS) 645 region.

Similar to a standard special subframe, a special subframe type 2 (S2) 647 may have three fields 641, 643, 645. In a standard special subframe, the three fields are a DL pilot time slot (DwPTS), a guard period (GP) and an UL pilot time slot (UpPTS). For convenience, the three fields 641, 643, 645 in the special subframe type 2 (S2) 647 may also be referred to as a DwPTS 641, a GP 643 and a UpPTS 645. Although the three fields 641, 643, 645 in the special subframe type 2 (S2) 647 may be referred to using the same names as in a standard special subframe, it should be noted that the characteristics of the three fields 641, 643, 645 in the special subframe type 2 (S2) 647 may be different from, similar to and/or the same as those of the same-named fields in the standard special subframe. It should be noted that a special subframe type 2 (S2) 647 may carry more data in the UpPTS 645 than a standard special subframe may carry in its UpPTS.

The special subframe type 2 (S2) 647 may provide increased resources for UL transmission while maintaining necessary DL signalling. For example, a special subframe type 2 (S2) 647 maintains the PDCCH region as needed, but has no PDSCH allocation. Most of the resources in a special subframe type 2 (S2) 647 are assigned for PUSCH transmissions. Since all UL control feedback is associated with existing UL subframes, no PUCCH allocation and PUCCH transmission may be allowed in a special subframe type 2 (S2) 647.

In the special subframe type 2 (S2) 647, a DwPTS 641 may be limited to provide only necessary DL control signalling (e.g., PDCCH and PHICH). The PDCCH may be used to schedule a PUSCH transmission in an UL subframe. However, since a PDCCH in a special subframe type 2 (S2) 647 may not schedule a PDCCH transmission, the size of the DwPTS 641 in a special subframe type 2 (S2) 647 may be smaller than a DwPTS in a regular DL subframe. For example, the number of orthogonal frequency-division multiplexing (OFDM) symbols used for a PDCCH may be limited to one or two when the number of resource blocks in a special subframe type 2 (S2) 647 is greater than 10. Furthermore, the number of OFDM symbols used for a PDCCH may be two when the number of resource blocks in a special subframe type 2 (S2) 647 is smaller than or equal to 10.

A guard period (GP) 643 allows a UE 102 to adjust a time advance for UL transmission. If the UL and DL have the same cyclic prefix (CP) configuration, the GP 643 in a special subframe type 2 (S2) 647 may have a length of one OFDM symbol. If the UL and DL have different cyclic prefix (CP) configurations, the GP may be less than or more than one OFDM symbol. However, to ensure the switch timing, the GP 643 (if present) of a special subframe type 2 (S2) 647 (if used) should have a length of at least $1456 \cdot T_s$.

If a DL subframe does not have an association with PUSCH scheduling, power control and PHICH feedback to any UL transmissions in the current UL-DL configuration, a DL subframe may be converted to a special subframe type 2 (S2) 647 with no reserved PDCCH region (e.g., a DwPTS 641 length of 0). If the DL subframe is immediately after an UL subframe (or possibly after a special subframe type 2 (S2) 647 in some configurations), the DL subframe can be fully converted to an UL subframe with no GP 643. If no PDCCH region is needed, but the DL subframe to be converted is after a DL subframe, the first OFDM symbol length may be reserved as a GP 643, while all other OFDM symbols may be allocated for UL transmission, for example.

In one implementation of the special subframe type 2 (S2) 647, the length of the DwPTS 641 and the length of the UpPTS 645 are given by Table (3), subject to the total length of DwPTS 641, GP 643 and UpPTS 645 being equal to $30720 \cdot T_s = 1$ ms.

TABLE (3)

| Number of OFDM symbols reserved for PDCCH | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0, no GP | 0 | $30720 \cdot T_S$ | $30720 \cdot T_S$ | 0 | $30720 \cdot T_S$ | $30720 \cdot T_S$ |
| 0, with GP | 0 | $28528 \cdot T_S$ | $28160 \cdot T_S$ | 0 | $28528 \cdot T_S$ | $28160 \cdot T_S$ |
| 1 | $2192 \cdot T_S$ | $26336 \cdot T_S$ | $25600 \cdot T_S$ | $2560 \cdot T_S$ | $26336 \cdot T_S$ | $25600 \cdot T_S$ |
| 2 | $4384 \cdot T_S$ | $24144 \cdot T_S$ | $23040 \cdot T_S$ | $5120 \cdot T_S$ | $24144 \cdot T_S$ | $23040 \cdot T_S$ |

Figure 7:
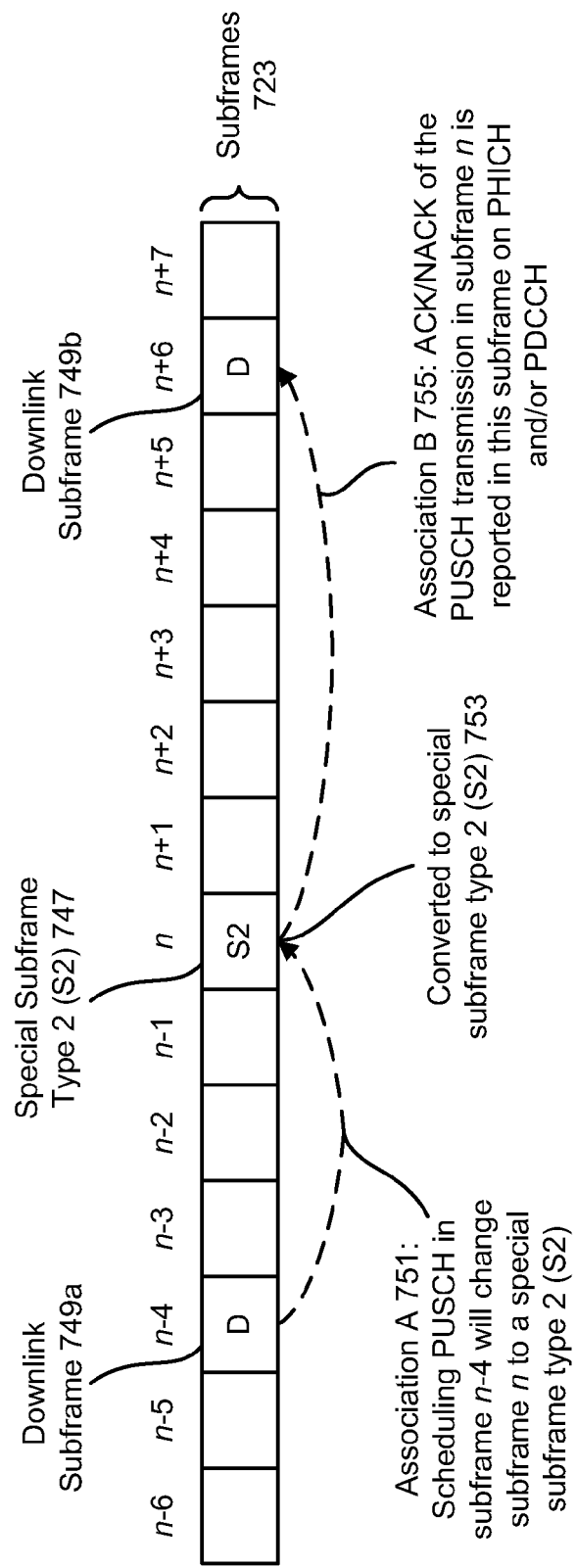
FIG. 7 is a diagram illustrating one example of downlink subframe conversion in accordance with the systems and methods disclosed herein.

FIG. 7 is a diagram illustrating one example of DL subframe conversion in accordance with the systems and methods disclosed herein. More specifically, FIG. 7 illustrates several subframes 723 in which a subframe n (that was a DL subframe in a default UL-DL configuration) may be converted to a special subframe type 2 (S2) 753. Additionally, FIG. 7 illustrates special subframe type 2 (S2) conversion rules and PHY layer signalling.

According to current 3GPP specifications, no PUSCH transmission should be scheduled in a DL subframe in TDD. The PUSCH assignment in an UL subframe has a one-to-one association mapping to a DL subframe. According to current specifications, there may be some DL subframes that cannot carry DCI format 0 for PUSCH allocation or cannot have PHICH feedback.

In accordance with the systems and methods disclosed herein, a DL subframe may be converted to an UL subframe or a special subframe type 2 (S2) 753 (using extended PHY layer signal, for example). This may occur, for example, when one or more DCI format 0 PUSCH transmissions are allocated in a DL subframe (that is not allowed to have DCI format 0 for PUSCH assignment in current 3GPP Release 8, 9 and 10 specifications) or when PHICH feedback is required for a previously allocated special subframe type 2.

For example, associations for a special subframe type 2 (S2) 747 (as extensions to current PHY layer associations, for example) may be specified as follows. If there are no existing associations in subframe n–a for PUSCH scheduling and/or ACK/NACK feedback for PUSCH transmission on a PHICH and/or a PDCCH, a PDCCH with DCI format 0 in subframe n–a (e.g., a DL subframe 749*a* including a PDCCH with DCI format 0) may convert a DL subframe n 753 (that was previously a DL subframe, for example) to a special subframe type 2 (S2) 747. For instance, association A 751 specifies that scheduling a PUSCH in a subframe n–a (e.g., DL subframe 749*a*) may convert subframe n to a special subframe type 2 (S2) 747. Subframe n may be converted to a special subframe type 2 (S2) 747 following control information in subframe n–a. One or more UEs 102 with a PUSCH allocation may transmit in subframe n. In FIG. 7, one example where a=4 is illustrated, though it should be noted that a may be another number in other examples. For instance, a≥4.

In The ACK/NACK feedback for a special subframe type 2 with subframe number n may be reported in subframe n+b (e.g., DL subframe 749*b*). For instance, association B 755 specifies that ACK/NACK for a special subframe type 2 (S2) 747 may be reported in subframe n+b. It should be noted that these associations 751, 755 may apply over radio frame boundaries. In FIG. 7, one example where b=6 is illustrated, though it should be noted that b may be another number in other examples with b≥4.

Figure 8:
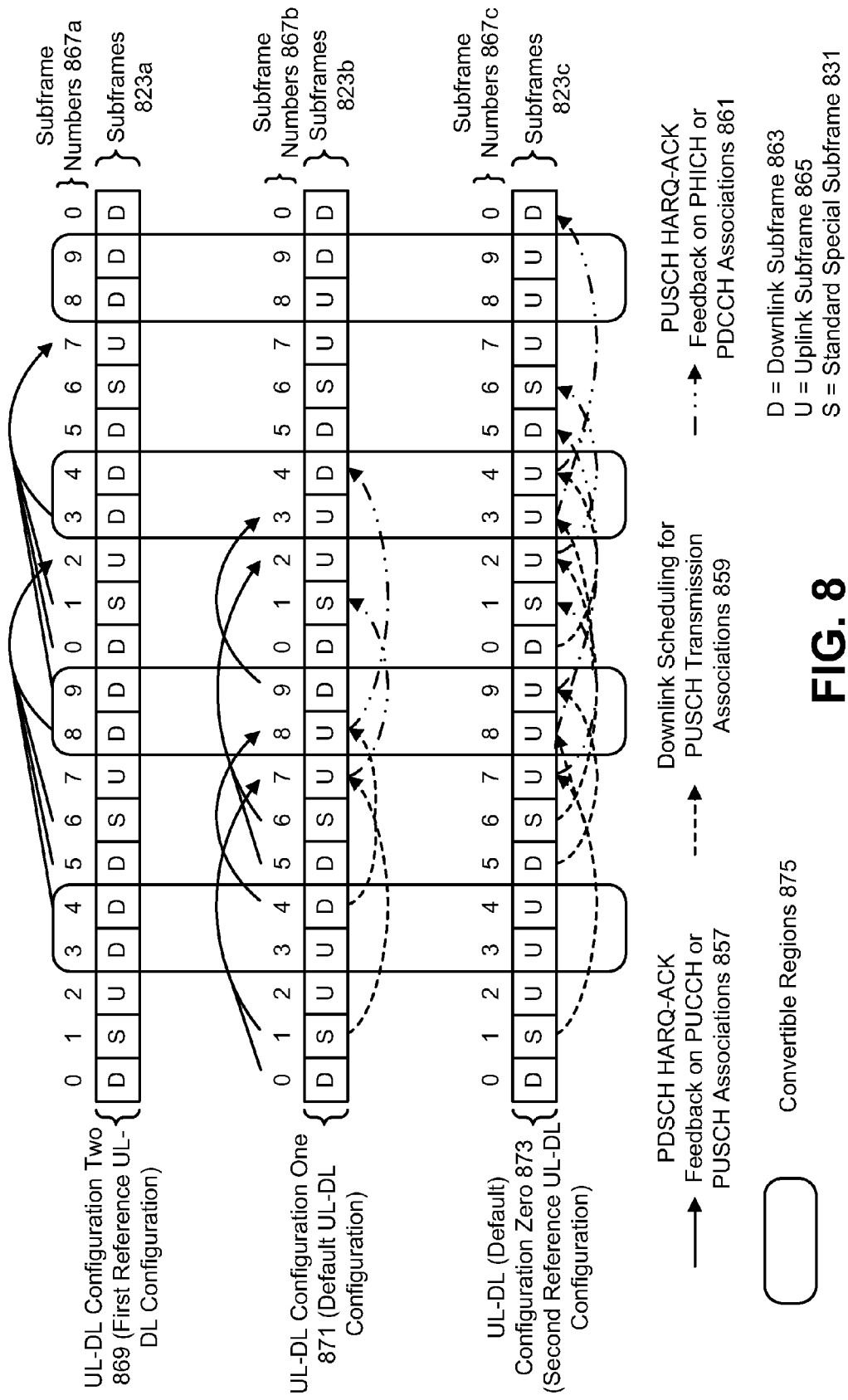
FIG. 8 is a diagram illustrating one example of uplink and downlink (UL-DL) configurations that may be utilized in accordance with the systems and methods disclosed herein.

FIG. 8 is a diagram illustrating one example of uplink and downlink (UL-DL) configurations that may be utilized in accordance with the systems and methods disclosed herein. In FIG. 8, some numerals have been spelled out in text for convenience. For example, UL-DL configuration 2 is labeled as "UL-DL Configuration Two 869, UL-DL configuration 1 is labeled as "UL-DL Configuration One 871" and UL-DL configuration 0 is labeled as "UL-DL Configuration Zero 873."

The example given in FIG. 8 illustrates UL-DL configuration one 871 (e.g., "1") as the default UL-DL configuration. In this example, an allowed dynamic UL-DL reconfiguration range 196 includes UL-DL configuration two 869 (e.g., "2"), UL-DL configuration one 871 (e.g., "1") and UL-DL configuration zero 873 (e.g., "0"). Based on the allowed dynamic UL-DL reconfiguration range, the UE 102 and the eNB 160 know the first reference UL-DL configuration (e.g., reference UL-DL configuration A 139*a*) for PDSCH HARQ-ACK as UL-DL configuration two 869 and the second reference UL-DL configuration 139*b* for PUSCH scheduling and PUSCH HARQ-ACK as configuration zero 873. Thus, this example illustrates different reference UL-DL configurations for dynamic TDD UL-DL reconfiguration.

It should be noted that subframes 823 marked with a "D" denote DL subframes 863, those marked with a "U" denote UL subframes 865 and those marked with an "S" denote standard special subframes 831. Furthermore, PDSCH HARQ-ACK feedback on PUCCH or PUSCH associations 857, downlink scheduling for PUSCH transmission associations 859 and PUSCH HARQ-ACK feedback on PHICH or PDCCH associations 861 are illustrated.

FIG. 8 illustrates UL-DL configuration two 869 (e.g., "UL-DL configuration 2") with subframes 823*a* and subframe numbers 867*a*. FIG. 8 also illustrates UL-DL configuration one 871 with subframes 823*b* and subframe numbers 867*b*. FIG. 8 further illustrates UL-DL configuration zero 873 with subframes 823*c* and subframe numbers 867*c*.

Any legacy UEs may follow the default UL-DL configuration, which is UL-DL configuration one 871 in this example. As illustrated in FIG. 8, convertible regions 875 (e.g., convertible regions 107) may include subframes 3-4 and 8-9. In this example, the first reference UL-DL configuration 139*a* for a (Release 11 and beyond) UE 102 may be UL-DL configuration two 869. Thus, the (Release 11 and beyond) UE 102 may utilize the PDSCH HARQ-ACK feedback on PUCCH or PUSCH associations 857 corresponding to UL-DL configuration two 869 in order to determine PDSCH HARQ-ACK timing and send any HARQ-ACK information corresponding to a PDSCH. For instance, the UE 102 may send HARQ-ACK feedback corresponding to subframe 4 in subframe 2 of the following radio frame.

In this example, the second reference UL-DL configuration 139*b* for a (Release 11) UE 102 may be UL-DL configuration zero 873. Thus, the (Release 11) UE 102 may utilize the downlink scheduling for PUSCH transmission associations 859 corresponding to UL-DL configuration zero 873 to determine a PUSCH schedule. Additionally or alternatively, the (Release 11) UE 102 may utilize PUSCH HARQ-ACK feedback on PHICH or PDCCH associations 861 corresponding to UL-DL configuration two 869 in order to determine PUSCH HARQ-ACK timing and receive any HARQ-ACK information corresponding to a PUSCH. For instance, the UE 102 may receive HARQ-ACK feedback corresponding to subframe 3 in subframe 0 of the following radio frame.

Figure 9:
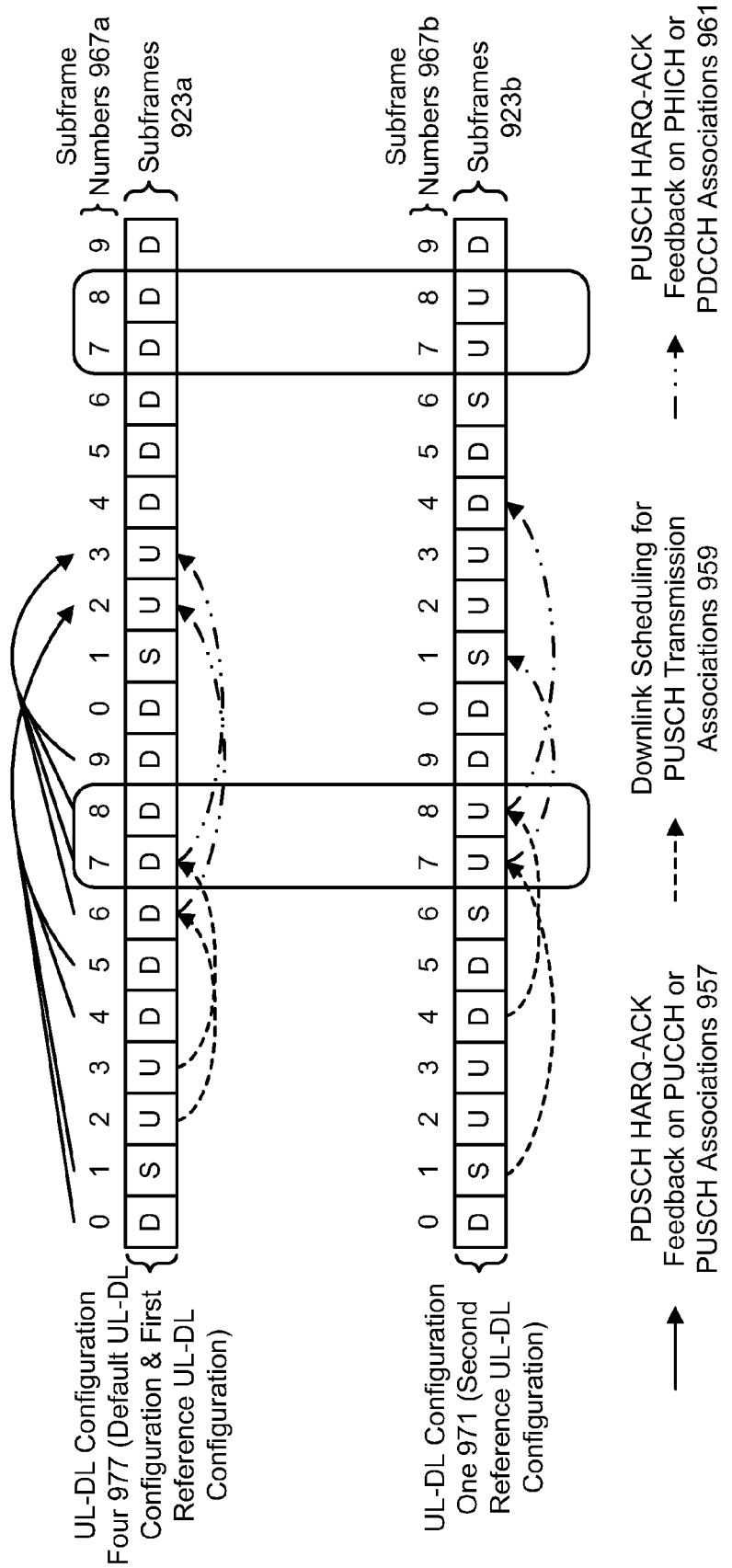
FIG. 9 is a diagram illustrating one example of UL-DL configurations that may be utilized in accordance with the systems and methods disclosed herein.

FIG. 9 is a diagram illustrating one example of UL-DL configurations that may be utilized in accordance with the systems and methods disclosed herein. In FIG. 9, some numerals have been spelled out in text for convenience. For example, UL-DL configuration 4 is labeled as "UL-DL Configuration Four 977 and UL-DL configuration 1 is labeled as "UL-DL Configuration One 971."

The example given in FIG. 9 illustrates a mixed periodicity with the default UL-DL configuration as configuration four 977 (e.g., "4"). In this example, where the dynamic UL-DL reconfiguration range 196 ranges between UL-DL configuration four 977 (e.g., "4") and UL-DL configuration one 971 (e.g., "1"). Furthermore, the convertible (e.g., "reconfigurable") subframes are subframes 7 and 8, included within convertible regions 975 (e.g., convertible regions 107). In this example, the first reference UL-DL configuration is configuration four 977, which has a minimum number of UL subframes (in the dynamic UL-DL reconfiguration range). The second reference UL-DL configuration is configuration one 971, which has a minimum number of DL subframes (e.g., a maximum number of UL subframes in the dynamic UL-DL reconfiguration range).

If a PUSCH is scheduled for a (Release 11) UE 102 in subframe 7, then subframe 7 may be converted to an UL subframe (e.g., special subframe type 2). More specifically, since subframe 6 is a regular DL subframe, subframe 7 may be converted to a special subframe type 2. Thus, the PUCCH in a converted subframe 7 is maintained, and the PUSCH scheduling and HARQ-ACK reporting for legacy UEs can still be performed. If a PUSCH is scheduled for a (Release 11) UE 102 in subframe 8, the UE may assume that subframe 7 is already converted to a special subframe type 2, and use subframe 8 as a normal UL subframe.

It should be noted that subframes 923 marked with a "D" denote DL subframes, those marked with a "U" denote UL subframes and those marked with an "S" denote standard special subframes. Furthermore, PDSCH HARQ-ACK feedback on PUCCH or PUSCH associations 957, downlink scheduling for PUSCH transmission associations 959 and PUSCH HARQ-ACK feedback on PHICH or PDCCH associations 961 are illustrated.

FIG. 9 illustrates UL-DL configuration four 977 (e.g., "UL-DL configuration 4") with subframes 923a and subframe numbers 967a. FIG. 9 also illustrates UL-DL configuration one 971 with subframes 923b and subframe numbers 967b.

Any legacy UEs may follow the default UL-DL configuration, which is UL-DL configuration four 977 in this example. As illustrated in FIG. 9, convertible regions 975 may include subframes 7-8. In this example, the first reference UL-DL configuration 139a for a (Release 11) UE 102 may be UL-DL configuration four 977. Thus, the (Release 11) UE 102 may utilize the PDSCH HARQ-ACK feedback on PUCCH or PUSCH associations 957 corresponding to UL-DL configuration four 977 in order to determine PDSCH HARQ-ACK timing and send any HARQ-ACK information corresponding to a PDSCH. For instance, the UE 102 may send HARQ-ACK feedback corresponding to subframe 7 in subframe 2 of the following radio frame.

In this example, the second reference UL-DL configuration 139b for a (Release 11) UE 102 may be UL-DL configuration one 971. Thus, the (Release 11) UE 102 may utilize the downlink scheduling for PUSCH transmission associations 959 corresponding to UL-DL configuration one 971 to determine a PUSCH schedule. Additionally or alternatively, the (Release 11) UE 102 may utilize PUSCH HARQ-ACK feedback on PHICH or PDCCH associations 961 corresponding to UL-DL configuration one 971 in order to determine PUSCH HARQ-ACK timing and receive any HARQ-ACK information corresponding to a PUSCH. For instance, the UE 102 may receive HARQ-ACK feedback corresponding to subframe 7 in subframe 1 of the following radio frame.

Figure 10:
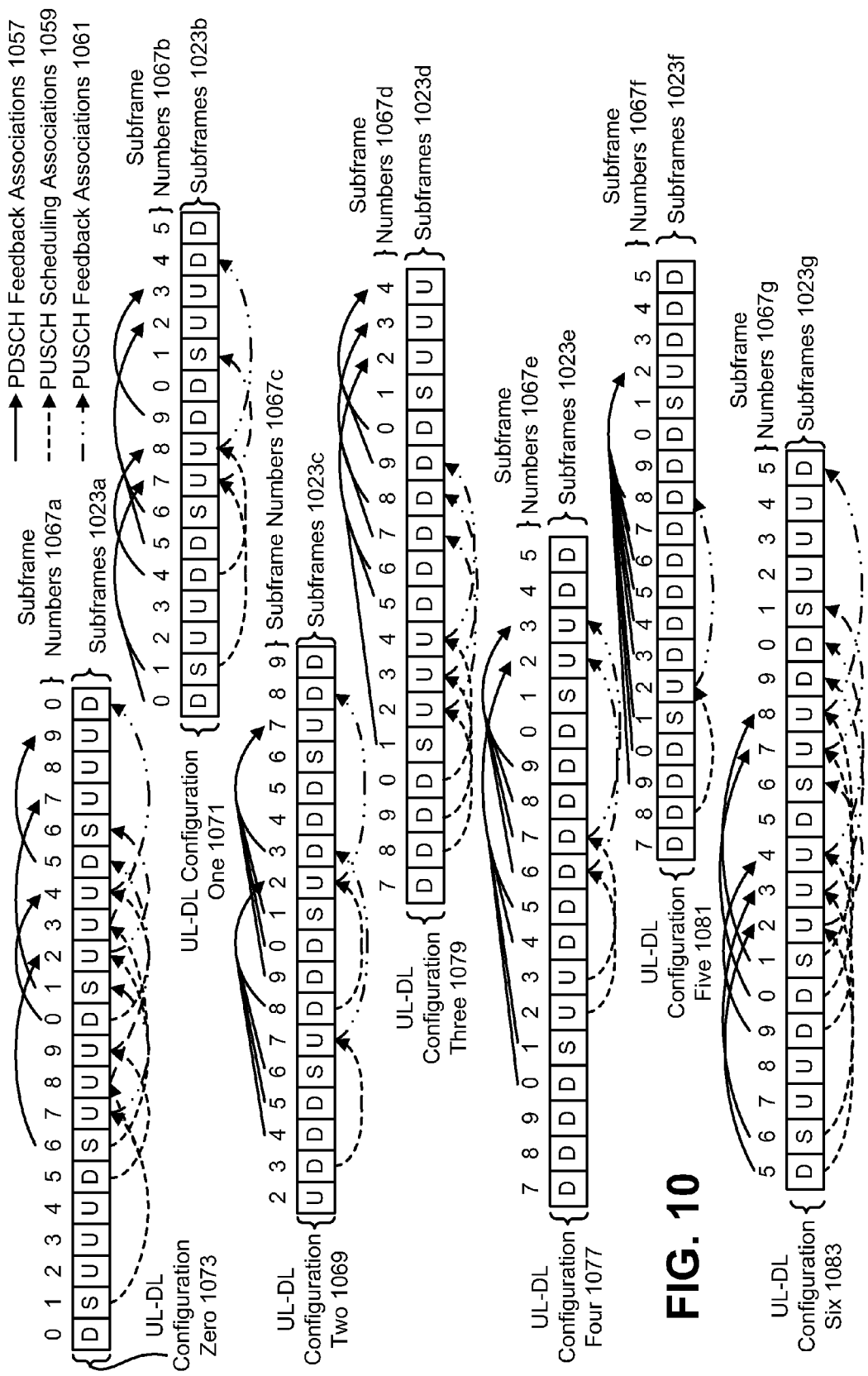

FIG. 10 is a diagram illustrating some UL-DL configurations 1069, 1071, 1073, 1077, 1079, 1081, 1083 that the systems and methods disclosed herein may be applied to. In particular, FIG. 10 illustrates UL-DL configuration zero 1073 (e.g., "UL-DL configuration 0") with subframes 1023a and subframe numbers 1067a, UL-DL configuration one 1071 (e.g., "UL-DL configuration 1") with subframes 1023b and subframe numbers 1067b, UL-DL configuration two 1069 (e.g., "UL-DL configuration 2") with subframes 1023c and subframe numbers 1067c and UL-DL configuration three 1079 (e.g., "UL-DL configuration 3") with subframes 1023d and subframe numbers 1067d. FIG. 10 also illustrates UL-DL configuration four 1077 (e.g., "UL-DL configuration 4") with subframes 1023e and subframe numbers 1067e, UL-DL configuration five 1081 (e.g., "UL-DL configuration 5") with subframes 1023f and subframe numbers 1067f and UL-DL configuration six 1033 (e.g., "UL-DL configuration 6") with subframes 1023g and subframe numbers 1067g.

FIG. 10 further illustrates PDSCH feedback associations 1057 (e.g., PDSCH HARQ-ACK feedback on PUCCH or PUSCH associations), PUSCH scheduling associations 1059 (e.g., downlink scheduling for PUSCH transmission associations) and PUSCH feedback associations 1061 (e.g., PUSCH HARQ-ACK feedback on PHICH or PDCCH associations) corresponding to each UL-DL configuration. It should be noted that some of the radio frames illustrated in FIG. 10 have been truncated for convenience.

The systems and methods may be applied to one or more of the UL-DL configurations 1069, 1071, 1073, 1077, 1079, 1081, 1083 illustrated in FIG. 10. For example, one or more PDSCH feedback associations 1057 corresponding to one of the UL-DL configurations illustrated in FIG. 10 may be applied to communications between a (Release 11) UE 102 and eNB 160 when determined as a first reference UL-DL configuration. Additionally or alternatively, one or more PUSCH scheduling associations 1059 corresponding to one of the UL-DL configurations illustrated in FIG. 10 may be applied to communications between a UE 102 and eNB 160 when determined as a second reference UL-DL configuration. Additionally or alternatively, one or more PUSCH feedback associations 1061 corresponding to one of the UL-DL configurations illustrated in FIG. 10 may be applied to communications between a UE 102 and eNB 160 when determined as a second reference UL-DL configuration.

Figure 11:
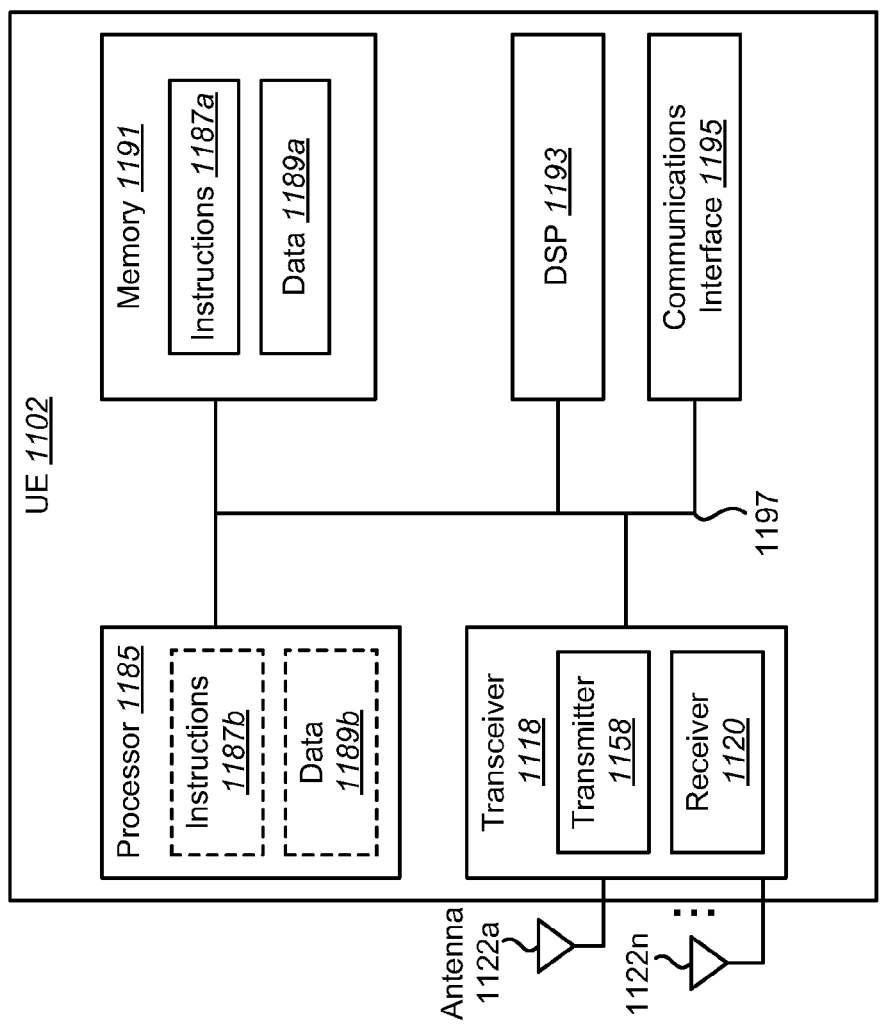
FIG. 11 illustrates various components that may be utilized in a User Equipment (UE)

FIG. 11 illustrates various components that may be utilized in a User Equipment (UE) 1102. The UE 102 described in connection with FIG. 1 may be implemented in accordance with the UE 1102 described in connection with FIG. 11. The UE 1102 includes a processor 1185 that controls operation of the UE 1102. The processor 1185 may also be referred to as a CPU. Memory 1191, which may include read-only memory (ROM), random access memory (RAM), a combination of the two or any type of device that may store information, provides instructions 1187a and data 1189a to the processor 1185. A portion of the memory 1191 may also include non-volatile random access memory (NVRAM). Instructions 1187b and data 1189b may also reside in the processor 1185. Instructions 1187b and/or data 1189b loaded into the processor 1185 may also include instructions 1187a and/or data 1189a from memory 1191 that were loaded for execution or processing by the processor 1185. The instructions 1187b may be executed by the processor 1185 to implement one or more of the methods 200, 500 described above.

The UE 1102 may also include a housing that contains one or more transmitters 1158 and one or more receivers 1120 to allow transmission and reception of data. The transmitter(s) 1158 and receiver(s) 1120 may be combined into one or more transceivers 1118. One or more antennas 1122a-n are attached to the housing and electrically coupled to the transceiver 1118.

The various components of the UE 1102 are coupled together by a bus system 1197, which may include a power bus, a control signal bus and a status signal bus, in addition to a data bus. However, for the sake of clarity, the various buses are illustrated in FIG. 11 as the bus system 1197. The UE 1102 may also include a digital signal processor (DSP) 1193 for use in processing signals. The UE 1102 may also include a communications interface 1195 that provides user access to the functions of the UE 1102. The UE 1102 illustrated in FIG. 11 is a functional block diagram rather than a listing of specific components.

Figure 12:
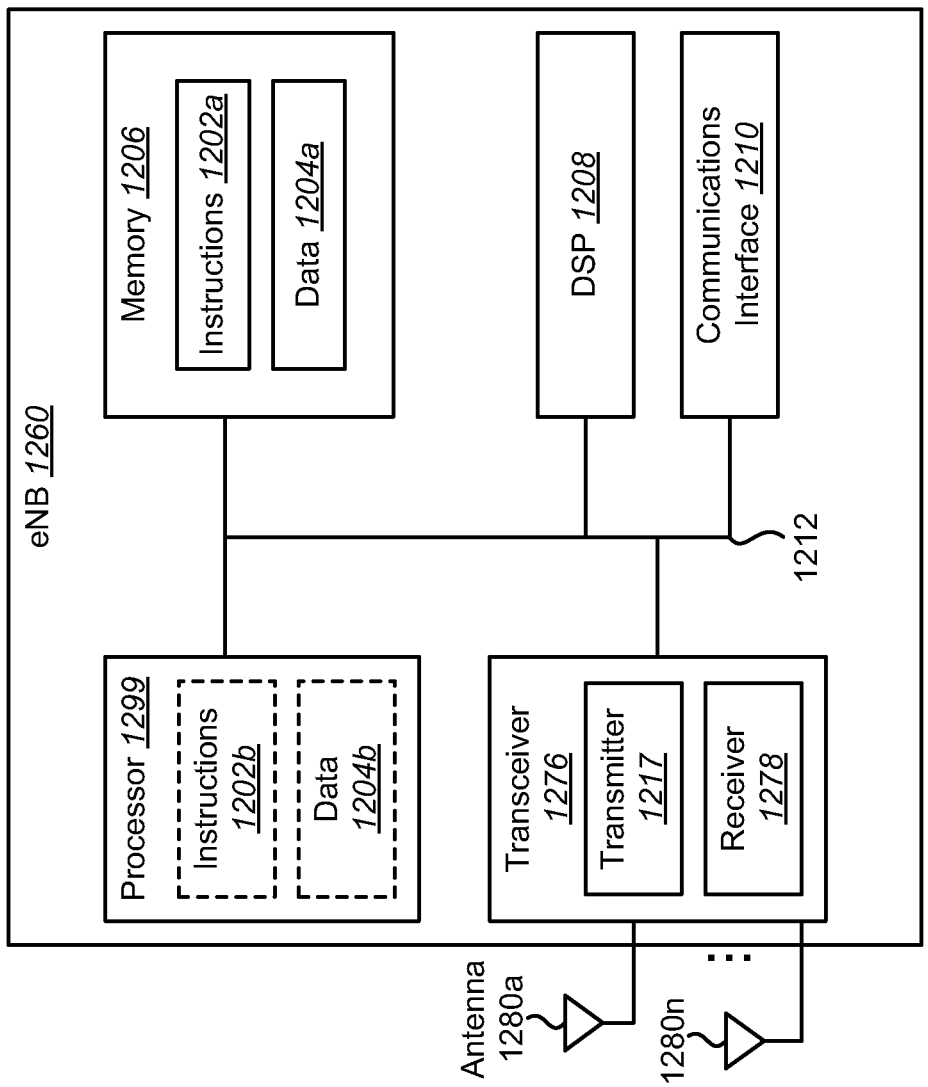
FIG. 12 illustrates various components that may be utilized in an evolved Node B (eNB).

FIG. 12 illustrates various components that may be utilized in an evolved Node B (eNB) 1260. The eNB 160 described in connection with FIG. 1 may be implemented in accordance with the eNB 1260 described in connection with FIG. 12. The eNB 1260 includes a processor 1299 that controls operation of the eNB 1260. The processor 1299 may also be referred to as a CPU. Memory 1206, which may include read-only memory (ROM), random access memory (RAM), a combination of the two or any type of device that may store information, provides instructions 1202a and data 1204a to the processor 1299. A portion of the memory 1206 may also include non-volatile random access memory (NVRAM). Instructions 1202b and data 1204b may also reside in the processor 1299. Instructions 1202b and/or data 1204b loaded into the processor 1299 may also include instructions 1202a and/or data 1204a from memory 1206 that were loaded for execution or processing by the processor 1299. The instructions 1202b may be executed by the processor 1299 to implement the method 300 described above.

The eNB 1260 may also include a housing that contains one or more transmitters 1217 and one or more receivers 1278 to allow transmission and reception of data. The transmitter(s) 1217 and receiver(s) 1278 may be combined into one or more transceivers 1276. One or more antennas 1280a-n are attached to the housing and electrically coupled to the transceiver 1276.

The various components of the eNB 1260 are coupled together by a bus system 1212, which may include a power bus, a control signal bus and a status signal bus, in addition to a data bus. However, for the sake of clarity, the various buses are illustrated in FIG. 12 as the bus system 1212. The eNB 1260 may also include a digital signal processor (DSP) 1208 for use in processing signals. The eNB 1260 may also include a communications interface 1210 that provides user access to the functions of the eNB 1260. The eNB 1260 illustrated in FIG. 12 is a functional block diagram rather than a listing of specific components.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A User Equipment (UE) configured to configure uplink and downlink (UL-DL) configurations in a cell, comprising:
a processor configured to or programmed to:
determine a default Time Domain Duplexing (TDD) UL-DL configuration for the cell;
determine whether dynamic UL-DL reconfiguration is configured for the cell;
determine a first reference UL-DL configuration and a second reference UL-DL configuration which regard the dynamic UL-DL reconfiguration in the cell; and
a receiver configured to or programmed to receive, on a Physical Downlink Control Channel (PDCCH), a physical layer signaling for the dynamic UL-DL reconfiguration, the physical layer signaling being used to convert subframes over the default TDD UL-DL configuration; wherein
the processor is configured to and/or programmed to:
determine timing for hybrid automatic repeat request acknowledgement (HARQ-ACK) information corresponding to a Physical Downlink Shared Channel (PDSCH) in the cell based on the first reference UL-DL configuration; and
determine timing for HARQ-ACK information corresponding to a Physical Uplink Shared Channel (PUSCH) in the cell based on the second reference UL-DL configuration.

2. An evolved Node B (eNB) configured to configure uplink and downlink (UL-DL) configurations in a cell, comprising:
a processor configured to or programmed to:
determine a default Time Domain Duplexing (TDD) UL-DL configuration for the cell;
determine whether dynamic UL-DL reconfiguration is configured for a User Equipment (UE) for the cell;
determine a first reference UL-DL configuration and a second reference UL-DL configuration which regard the dynamic UL-DL reconfiguration in the cell; and
a transmitter configured to and/or programmed to transmit, on a Physical Downlink Control Channel (PDCCH), a physical layer signaling for the dynamic UL-DL reconfiguration, the physical layer signaling being used to convert subframes over the default TDD UL-DL configuration; wherein
the processor is configured to or programmed to:
determine timing for hybrid automatic repeat request acknowledgement (HARQ-ACK) information corresponding to a Physical Downlink Shared Channel (PDSCH) in the cell based on the first reference UL-DL configuration; and
determine timing for HARQ-ACK information corresponding to a Physical Uplink Shared Channel (PUSCH) in the cell based on the second reference UL-DL configuration.

3. A communication method of a User Equipment (UE) which is configured to configure uplink and downlink (UL-DL) configurations in a cell, the communication method comprising:
determining a default Time Domain Duplexing (TDD) UL-DL configuration for the cell;
determining whether dynamic UL-DL reconfiguration is configured for the cell;
determining a first reference UL-DL configuration and a second reference UL-DL configuration which regard the dynamic UL-DL reconfiguration in the cell;
receiving, on a Physical Downlink Control Channel (PDCCH), a physical layer signaling for the dynamic UL-DL reconfiguration, the physical layer signaling being used to convert subframes over the default TDD UL-DL configuration;

determining timing for hybrid automatic repeat request acknowledgement (HARQ-ACK) information corresponding to a Physical Downlink Shared Channel (PDSCH) in the cell based on the first reference UL-DL configuration; and determining timing for HARQ-ACK information corresponding to a Physical Uplink Shared Channel (PUSCH) in the cell based on the second reference UL-DL configuration.

4. A communication method of an evolved Node B (eNB) which is configured to configure uplink and downlink (UL-DL) configurations in a cell, the communication method comprising:

determining a default Time Domain Duplexing (TDD) UL-DL configuration for the cell;

determining whether dynamic UL-DL reconfiguration is configured for a User Equipment (UE) for the cell;

determining a first reference UL-DL configuration and a second reference UL-DL configuration which regard the dynamic UL-DL reconfiguration in the cell;

transmitting, on a Physical Downlink Control Channel (PDCCH), a physical layer signaling for the dynamic UL-DL reconfiguration, the physical layer signaling being used to convert subframes over the default TDD UL-DL configuration;

determining timing for hybrid automatic repeat request acknowledgement (HARQ-ACK) information corresponding to a Physical Downlink Shared Channel (PDSCH) in the cell based on the first reference UL-DL configuration; and determining timing for HARQ-ACK information corresponding to a Physical Uplink Shared Channel (PUSCH) in the cell based on the second reference UL-DL configuration.

* * * * *